US012649618B2

(12) United States Patent
Pherson

(10) Patent No.: US 12,649,618 B2
(45) Date of Patent: Jun. 9, 2026

(54) THERMALLY INSULATED AIR CARGO CONTAINER

(71) Applicant: Advanced Composite Structures, LLC, Charleston, SC (US)

(72) Inventor: Thomas R. Pherson, Daniel Island, SC (US)

(73) Assignee: Advanced Composite Structures, LLC, Charleston, SC (US)

( * ) Notice: Subject to any disclaimer, the term of this patent is extended or adjusted under 35 U.S.C. 154(b) by 0 days.

(21) Appl. No.: 18/649,013

(22) Filed: Apr. 29, 2024

(65) Prior Publication Data

US 2024/0278973 A1 Aug. 22, 2024

Related U.S. Application Data

(63) Continuation of application No. 16/913,410, filed on Jun. 26, 2020, now Pat. No. 11,981,498.

(Continued)

(51) Int. Cl.
B65D 81/38 (2006.01)
B32B 3/12 (2006.01)
(Continued)

(52) U.S. Cl.
CPC ........ B65D 81/3823 (2013.01); B32B 37/142 (2013.01); B32B 37/18 (2013.01);
(Continued)

(58) Field of Classification Search
CPC ...... B65D 90/507; B65D 90/08; B65D 81/38; B65D 81/3823; B65D 88/14; B65D 90/022; B65D 90/48; B65D 90/505
See application file for complete search history.

(56) References Cited

U.S. PATENT DOCUMENTS

| | | | |
|---|---|---|---|
| 1,557,382 | A | 10/1925 | Sundback |
| 2,495,636 | A | 1/1950 | Hoeltzel et al. |

(Continued)

FOREIGN PATENT DOCUMENTS

| | | |
|---|---|---|
| CN | 104093645 | 8/2017 |
| CN | 207585186 U | 7/2018 |

(Continued)

OTHER PUBLICATIONS

Chinese Office Action for Application No. 202080054385.3, dated Jun. 27, 2024, 11 pgs.

(Continued)

*Primary Examiner* — Alicia J Weydemeyer
(74) *Attorney, Agent, or Firm* — Womble Bond Dickinson (US) LLP

(57) ABSTRACT

A thermally insulated panel includes a first skin, a second skin spaced apart from the first skin, and a core that is disposed between and bonded to the first skin and the second skin such that the core transfers loads between the first skin and the second skin. The core includes a porous filler material that has a vacuum drawn therein such that the core resists transfer of thermal energy through the panel. A cargo container including thermally insulated panels and a method of manufacturing the thermally insulated panels are also disclosed. In addition, a method of repairing a vacuum insulated panel is disclosed.

18 Claims, 13 Drawing Sheets

Related U.S. Application Data

(60) Provisional application No. 62/867,964, filed on Jun. 28, 2019.

(51) Int. Cl.

| | |
|---|---|
| *B32B 5/18* | (2006.01) |
| *B32B 37/14* | (2006.01) |
| *B32B 37/18* | (2006.01) |
| *B65D 88/14* | (2006.01) |
| *B65D 90/02* | (2019.01) |
| *B65D 90/08* | (2006.01) |
| *B65D 90/48* | (2006.01) |
| *B65D 90/505* | (2019.01) |
| *B65D 90/507* | (2019.01) |

(52) U.S. Cl.
CPC . *B32B 3/12* (2013.01); *B32B 5/18* (2013.01); *B32B 2250/03* (2013.01); *B32B 2305/022* (2013.01); *B32B 2305/024* (2013.01); *B32B 2305/026* (2013.01); *B65D 81/38* (2013.01); *B65D 88/14* (2013.01); *B65D 90/022* (2013.01); *B65D 90/08* (2013.01); *B65D 90/48* (2013.01); *B65D 90/505* (2013.01); *B65D 90/507* (2019.02)

(56) References Cited

U.S. PATENT DOCUMENTS

| | | | |
|---|---|---|---|
| 3,160,307 | A | 12/1964 | Morrison |
| 3,161,258 | A | 12/1964 | Chapman |
| 3,165,760 | A | 1/1965 | Aram |
| 3,251,399 | A | 5/1966 | Grossman |
| 3,372,729 | A | 3/1968 | Lindenmayer |
| 3,556,448 | A | 1/1971 | Dobbs |
| 3,558,423 | A | 1/1971 | Rossetti, Jr. |
| 3,586,013 | A | 6/1971 | Gladden |
| 3,591,034 | A | 7/1971 | Lohr |
| 3,616,838 | A | 11/1971 | Barr |
| 3,657,036 | A | 4/1972 | Mullenhoff et al. |
| 3,657,042 | A | 4/1972 | Rerolle |
| 3,671,542 | A | 6/1972 | Kwolek |
| 3,709,552 | A | 1/1973 | Broadbent |
| 3,723,234 | A | 3/1973 | MacDonald |
| 3,785,694 | A | 1/1974 | Sargent |
| 3,856,072 | A | 12/1974 | Sund |
| 3,951,284 | A | 4/1976 | Fell |
| 4,046,186 | A | 9/1977 | Nordstrom |
| 4,131,150 | A | 12/1978 | Papadakis |
| 4,137,394 | A | 1/1979 | Meihuizen |
| 4,212,406 | A | 7/1980 | Mittelmann |
| 4,221,256 | A | 9/1980 | Karaki |
| 4,284,119 | A | 8/1981 | Martin |
| 4,304,824 | A | 12/1981 | Karpinski |
| 4,335,774 | A | 6/1982 | Price |
| 4,356,138 | A | 10/1982 | Kavesh |
| 4,391,865 | A | 7/1983 | Constance |
| 4,406,318 | A | 9/1983 | Cukierski |
| 4,413,110 | A | 11/1983 | Kavesh |
| 4,424,253 | A | 1/1984 | Anderson |
| 4,429,730 | A | 2/1984 | Elston |
| 4,440,711 | A | 4/1984 | Kwon |
| 4,457,985 | A | 7/1984 | Harpell |
| 4,493,870 | A | 1/1985 | Vrouenraets |
| 4,535,027 | A | 8/1985 | Kobashi |
| 4,538,663 | A | 9/1985 | Looker |
| 4,545,611 | A | 10/1985 | Broadbent |
| 4,557,961 | A | 12/1985 | Gorges |
| 4,597,818 | A | 7/1986 | Aoyama |
| 4,599,267 | A | 7/1986 | Kwon |
| 4,600,235 | A | 7/1986 | Frederick |
| 4,601,405 | A | 7/1986 | Riemer |
| 4,738,371 | A | 4/1988 | Wakeman |
| 4,780,351 | A | 10/1988 | Czempoyesh |
| 4,795,047 | A | 1/1989 | Dunwoodie |
| 4,802,233 | A | 1/1989 | Skamser |
| 4,852,316 | A | 8/1989 | Webb |
| 4,863,779 | A | 9/1989 | Daponte |
| 4,874,648 | A | 10/1989 | Hill |
| 4,876,774 | A | 10/1989 | Kavesh |
| 4,894,281 | A | 1/1990 | Yagi |
| 4,895,878 | A | 1/1990 | Jourquin |
| 4,911,317 | A | 3/1990 | Schloesser |
| 4,957,804 | A | 9/1990 | Hendrix |
| 4,983,433 | A | 1/1991 | Shirasaki |
| 4,983,449 | A | 1/1991 | Nee |
| 4,991,640 | A | 2/1991 | Verkindt |
| 5,082,721 | A | 1/1992 | Smith, Jr. |
| 5,105,970 | A | 4/1992 | Malone |
| 5,143,245 | A | 9/1992 | Malone |
| 5,160,472 | A | 11/1992 | Zachariades |
| 5,160,767 | A | 11/1992 | Genske |
| 5,169,697 | A | 12/1992 | Langley |
| 5,183,176 | A | 2/1993 | Meier |
| 5,248,364 | A | 9/1993 | Liu |
| 5,261,536 | A | 11/1993 | Wilson |
| 5,266,390 | A | 11/1993 | Garland |
| 5,284,540 | A | 2/1994 | Roth |
| 5,286,576 | A | 2/1994 | Srail |
| 5,360,129 | A | 11/1994 | Lee |
| 5,377,856 | A | 1/1995 | Brierton |
| 5,389,448 | A | 2/1995 | Schirmer |
| 5,395,682 | A | 3/1995 | Holland |
| 5,398,831 | A | 3/1995 | Avramides |
| 5,401,344 | A | 3/1995 | Dickson |
| RE34,892 | E | 4/1995 | Dunwoodie |
| 5,431,284 | A | 7/1995 | Wilson |
| 5,443,874 | A | 8/1995 | Tachi |
| 5,445,883 | A | 8/1995 | Kobayashi et al. |
| 5,454,471 | A | 10/1995 | Norvell |
| 5,460,884 | A | 10/1995 | Kobylivker |
| 5,472,760 | A | 12/1995 | Norvell |
| 5,480,706 | A | 1/1996 | Li |
| 5,490,567 | A | 2/1996 | Speer |
| 5,500,305 | A | 3/1996 | Bridges et al. |
| 5,505,810 | A * | 4/1996 | Kirby ..................... B32B 27/00 |
| | | | 156/286 |
| 5,529,363 | A | 6/1996 | Borowski, Jr. |
| 5,547,536 | A | 8/1996 | Park |
| 5,567,498 | A | 10/1996 | McCarter |
| 5,570,801 | A | 11/1996 | Younger |
| 5,578,373 | A | 11/1996 | Kobayashi |
| 5,601,201 | A | 2/1997 | Looker |
| 5,601,897 | A | 2/1997 | Vermilion et al. |
| 5,652,041 | A | 7/1997 | Buerger |
| 5,658,037 | A | 8/1997 | Evans |
| 5,667,002 | A | 9/1997 | Neustadt |
| 5,677,029 | A | 10/1997 | Prevorsek |
| 5,702,657 | A | 12/1997 | Yoshida |
| 5,761,854 | A | 6/1998 | Johnson |
| 5,789,327 | A | 8/1998 | Rousseau |
| 5,819,474 | A | 10/1998 | Strom |
| 5,851,668 | A | 12/1998 | Sandor |
| 5,867,002 | A | 2/1999 | Dauvergne |
| 5,888,610 | A | 3/1999 | Fournier |
| 5,915,445 | A | 6/1999 | Rauenbusch |
| 5,916,672 | A | 6/1999 | Reeves et al. |
| 5,927,025 | A | 7/1999 | Brockman |
| 5,958,805 | A | 9/1999 | Quinones |
| 5,976,998 | A | 11/1999 | Sandor |
| 5,979,684 | A | 11/1999 | Ohnishi |
| 6,054,205 | A | 4/2000 | Newman |
| 6,080,474 | A | 6/2000 | Oakley |
| 6,103,372 | A | 8/2000 | Sandor |
| 6,113,031 | A | 9/2000 | Williams |
| 6,156,682 | A | 12/2000 | Fletemier |
| 6,161,714 | A | 12/2000 | Matsuura |
| 6,164,030 | A | 12/2000 | Dietrich |
| 6,216,745 | B1 * | 4/2001 | Augustynowicz .... F16L 59/185 |
| | | | 138/155 |
| 6,237,793 | B1 | 5/2001 | Fingerhut |
| 6,280,546 | B1 | 8/2001 | Holland |
| 6,291,049 | B1 | 9/2001 | Kunkel et al. |

(56) References Cited

U.S. PATENT DOCUMENTS

| | | | |
|---|---|---|---|
| 6,322,873 B1 | 11/2001 | Orologio | |
| 6,358,591 B1 | 3/2002 | Smith | |
| 6,435,101 B1 | 8/2002 | Marker | |
| 6,446,751 B1 | 9/2002 | Ahuja | |
| 6,503,856 B1 | 1/2003 | Broadway et al. | |
| 6,511,730 B1 | 1/2003 | Blair | |
| 6,513,703 B2 | 2/2003 | Becker | |
| 6,701,948 B2 | 3/2004 | Jopp | |
| 6,711,872 B2 | 3/2004 | Anderson | |
| 6,749,076 B2 | 6/2004 | Fingerhut | |
| 6,755,232 B1 | 6/2004 | Holland et al. | |
| 6,758,057 B2 | 7/2004 | Vince, II et al. | |
| 6,787,228 B2 | 9/2004 | Campbell | |
| 6,800,367 B2 | 10/2004 | Hanyon | |
| 6,802,551 B2 | 10/2004 | Nelson | |
| 6,818,091 B1 | 11/2004 | Holland | |
| 6,825,137 B2 | 11/2004 | Fu | |
| 6,918,501 B2 | 7/2005 | Wang | |
| 6,926,188 B2 | 8/2005 | Hazeyama | |
| 6,962,188 B2 | 11/2005 | Coenraets | |
| 6,992,027 B1 | 1/2006 | Buckingham | |
| 7,001,857 B2 | 2/2006 | Degroote | |
| 7,087,300 B2 | 8/2006 | Hanyon | |
| 7,111,661 B2 | 9/2006 | Laugenbach | |
| 7,112,299 B2 | 9/2006 | Merrick | |
| 7,114,756 B2 | 10/2006 | Nelson | |
| 7,195,025 B2 | 3/2007 | Choi | |
| 7,210,492 B2 | 5/2007 | Gerrie | |
| 7,264,878 B2 | 9/2007 | Miller | |
| 7,311,216 B2 | 12/2007 | Donnelly et al. | |
| 7,622,406 B2 | 11/2009 | Holland et al. | |
| D617,522 S | 6/2010 | Teien | |
| 7,748,172 B2 | 7/2010 | Zupancich et al. | |
| 7,785,693 B2 | 8/2010 | Johnson | |
| 7,805,897 B2 | 10/2010 | Holland | |
| 7,820,570 B2 | 10/2010 | Holland et al. | |
| 7,828,029 B2 | 11/2010 | Holland et al. | |
| 7,846,528 B2 | 12/2010 | Johnson | |
| D630,815 S | 1/2011 | Teien | |
| 7,901,537 B2 | 3/2011 | Jones | |
| 7,913,511 B2 | 3/2011 | Meyer | |
| 7,972,698 B2 | 7/2011 | Miller | |
| 8,002,919 B2 | 8/2011 | Johnson | |
| 8,322,955 B2 | 12/2012 | Arnesen | |
| 8,342,588 B2 | 1/2013 | Skaradzinski | |
| 8,479,801 B2 | 7/2013 | Holland et al. | |
| 8,784,605 B2 | 7/2014 | Fingerhut | |
| 8,839,842 B2 | 9/2014 | Ashelin | |
| 8,973,769 B2 | 3/2015 | Huber | |
| 9,051,014 B2 | 6/2015 | Lookebill | |
| 9,090,392 B2 | 7/2015 | Loeschen | |
| D740,555 S | 10/2015 | Huber | |
| D740,556 S | 10/2015 | Huber | |
| 9,174,796 B2 | 11/2015 | Pherson et al. | |
| 9,174,797 B2 | 11/2015 | Pherson et al. | |
| 9,248,958 B2 | 2/2016 | Pherson | |
| 9,296,555 B2 | 3/2016 | Kawka | |
| 9,487,953 B2 | 11/2016 | Nagarajan et al. | |
| 9,827,529 B2 | 11/2017 | Rebouillat | |
| 9,834,374 B2 | 12/2017 | Pherson | |
| 9,930,997 B2 | 4/2018 | Larpenteur | |
| 10,894,661 B2 | 1/2021 | Pherson et al. | |
| 11,084,652 B2 | 8/2021 | Pherson et al. | |
| 2001/0001466 A1 | 5/2001 | Fingerhut | |
| 2002/0114937 A1* | 8/2002 | Albert | C08J 9/28 |
| | | | 428/69 |
| 2003/0098250 A1 | 5/2003 | Sabounjian | |
| 2003/0106414 A1 | 6/2003 | Wang | |
| 2004/0017789 A1 | 1/2004 | Hoynck | |
| 2004/0045847 A1 | 3/2004 | Fairbank | |
| 2004/0058119 A1 | 3/2004 | Wynne | |
| 2004/0058603 A1 | 3/2004 | Hayes | |
| 2004/0092379 A1 | 5/2004 | Lewis | |
| 2004/0105994 A1 | 6/2004 | Lu | |

| | | | |
|---|---|---|---|
| 2004/0112907 A1* | 6/2004 | Donnelly | B65D 88/14 |
| | | | 220/660 |
| 2004/0226309 A1 | 11/2004 | Broussard | |
| 2005/0074593 A1 | 4/2005 | Day | |
| 2005/0109382 A1 | 5/2005 | Choi | |
| 2005/0142971 A1 | 6/2005 | Chen | |
| 2005/0211839 A1 | 9/2005 | Movsesian | |
| 2006/0035555 A1 | 2/2006 | Narayanan | |
| 2006/0138911 A1 | 6/2006 | Ransom | |
| 2006/0189236 A1 | 8/2006 | Davis | |
| 2006/0239791 A1 | 10/2006 | Morris | |
| 2007/0034110 A1 | 2/2007 | Zupancich et al. | |
| 2007/0256379 A1 | 11/2007 | Edwards | |
| 2007/0289682 A1 | 12/2007 | Young | |
| 2008/0003075 A1 | 1/2008 | Mapitigama | |
| 2008/0070024 A1 | 3/2008 | Curran | |
| 2008/0102721 A1 | 5/2008 | Holland et al. | |
| 2008/0110580 A1 | 5/2008 | Hoerner | |
| 2008/0145592 A1 | 6/2008 | Johnson | |
| 2008/0197649 A1 | 8/2008 | Byler | |
| 2008/0302049 A1 | 12/2008 | Stoneburner | |
| 2008/0311336 A1 | 12/2008 | Dolgopolsky | |
| 2008/0313980 A1 | 12/2008 | Holland | |
| 2009/0004393 A1 | 1/2009 | Rodgers | |
| 2009/0062432 A1 | 3/2009 | Doesburg | |
| 2009/0140097 A1 | 6/2009 | Collier | |
| 2009/0183808 A1 | 7/2009 | Sappington | |
| 2009/0209155 A1 | 8/2009 | Goulet | |
| 2009/0258180 A1 | 10/2009 | Goulet | |
| 2010/0132894 A1 | 6/2010 | Knutson | |
| 2010/0209679 A1 | 8/2010 | Tompkins | |
| 2010/0243807 A1 | 9/2010 | Hossain | |
| 2010/0270318 A1 | 10/2010 | Dagher | |
| 2011/0091713 A1 | 4/2011 | Miller | |
| 2011/0136401 A1 | 6/2011 | Hanusa | |
| 2011/0180959 A1 | 7/2011 | Donnelly | |
| 2011/0274915 A1 | 11/2011 | Roberson | |
| 2012/0018102 A1 | 1/2012 | Ungs | |
| 2012/0111862 A1 | 5/2012 | Siegbert | |
| 2012/0118881 A1 | 5/2012 | Holland | |
| 2012/0118882 A1 | 5/2012 | Holland | |
| 2012/0151851 A1 | 6/2012 | Cantin | |
| 2012/0266561 A1 | 10/2012 | Piedmont | |
| 2013/0032260 A1 | 2/2013 | Davies | |
| 2013/0161331 A1 | 6/2013 | Pherson | |
| 2013/0287978 A1* | 10/2013 | Lee | B32B 27/32 |
| | | | 428/35.2 |
| 2013/0340953 A1 | 12/2013 | Knutson | |
| 2014/0329429 A1 | 11/2014 | Eleazer | |
| 2014/0335750 A1 | 11/2014 | Adams | |
| 2015/0013275 A1 | 1/2015 | Davies | |
| 2015/0053086 A1 | 2/2015 | Rebouillat | |
| 2015/0210035 A1 | 7/2015 | Rippel et al. | |
| 2015/0246511 A1 | 9/2015 | Lookebill | |
| 2015/0246749 A1 | 9/2015 | Huber | |
| 2015/0267396 A1 | 9/2015 | Cantin | |
| 2015/0273787 A1* | 10/2015 | Nansen | E04C 2/365 |
| | | | 29/897 |
| 2015/0343736 A1 | 12/2015 | Kawka | |
| 2016/0039172 A1 | 2/2016 | Kawka | |
| 2016/0046441 A1 | 2/2016 | Holland et al. | |
| 2016/0107816 A1 | 4/2016 | Larpenteur et al. | |
| 2016/0137408 A1 | 5/2016 | Pherson | |
| 2016/0332417 A1 | 11/2016 | Kawka | |
| 2017/0043687 A1 | 2/2017 | Preisler | |
| 2017/0096295 A1 | 4/2017 | Pherson et al. | |
| 2017/0108261 A1 | 4/2017 | Broussard | |
| 2018/0290827 A1 | 10/2018 | Pherson | |

FOREIGN PATENT DOCUMENTS

| | | | |
|---|---|---|---|
| DE | 3004699 A1 | 8/1980 | |
| DE | 4441842 A1 | 6/1995 | |
| EP | 0520745 A1 | 12/1992 | |
| EP | 2734458 A2 | 5/2014 | |
| GB | 995420 A | 6/1965 | |
| GB | 2051667 A | 1/1981 | |
| GB | 2349140 A | 10/2000 | |
| GB | 2501053 A | 10/2013 | |

(56) References Cited

FOREIGN PATENT DOCUMENTS

| JP | S5388072 | A | 8/1978 |
| JP | H11210353 | A | 8/1999 |
| JP | 2004203395 | A | 7/2004 |
| KR | 20100119939 | | 11/2010 |
| WO | 2001074688 | A1 | 10/2001 |
| WO | 2005016643 | A1 | 2/2005 |
| WO | 2008054731 | A2 | 5/2008 |
| WO | 2010088811 | A1 | 8/2010 |
| WO | 2012085212 | A2 | 6/2012 |
| WO | 2013012782 | A2 | 1/2013 |
| WO | 2013106640 | A1 | 7/2013 |
| WO | 2015108422 | A1 | 7/2015 |
| WO | 2018142133 | A1 | 8/2018 |

OTHER PUBLICATIONS

English abstract of DE4441842, Nov. 3, 1997, 18 pgs.
English abstract of JP 11210353, last printed Dec. 31, 2015, 2 pgs.
English translation of the abstract of DE 3004699, last printed Oct. 17, 2011, 3 pgs.

Internet advertisement for Pitched-based Carbon Fiber/Composite, http://www.nsc.co.jp/nsmat/English/business_domain/bd09.html, last printed Jan. 31, 2012, 2 pgs.
Internet advertisement for Transonite Sandwich Panels, http://www.ebertcomposites.com/transonite.html, last printed Jan. 31, 2012, 2 pgs.
Internet advertisement for Vince Kelly's Carbon-Fiber Technology, http://www.goecities.com/capecanaveral/1320/, last printed Jan. 31, 2012, 16 pgs.
Internet Wikipedia encyclopedia on Carbon (fiber), http://en.wikipedia.org/wiki/Carbon_(fiber), last printed Jan. 31, 2012, 5 pgs.
Supreme Zipper Industries, Zipper Chain, 2010 copyright, last printed Dec. 31, 2015, 2 pgs.
Supreme Zipper Industries, Zipper Terminology Guide, 2010 copyright, last printed Dec. 31, 2015, 10 pgs.
Hammond et al. "Application of Vacuum Insulation Panel in the cold chain - Analysis of viability", London South Bank University, Jul. 28, 2014.
International Search Report and Written Opinion for PCT/US2020/039893 dated Sep. 30, 2020.

* cited by examiner

THERMALLY INSULATED AIR CARGO CONTAINER

CROSS-REFERENCE TO RELATED APPLICATIONS

This application is a continuation of U.S. patent application Ser. No. 16/913,410, filed Jun. 26, 2020, which claimed priority to, and benefit of, U.S. Provisional Patent Application Ser. No. 62/867,964, filed Jun. 28, 2019. The entire contents of each of the above applications are hereby incorporated by reference.

TECHNICAL FIELD

The present disclosure relates to the field of transportation, and, more particularly, to thermally insulated cargo containers for aircraft.

BACKGROUND

Air cargo is typically transported in a container generally referred to as Unit Load Device ("ULD"), which is stowed in a cargo hold of an aircraft, which can either be below and/or above the deck, e.g., below the deck in a passenger aircraft or below and above the deck in transport aircraft. The outer size and shape of ULDs vary depending upon the type of aircraft such that the outer dimensions of the ULDs are determined by the type of aircraft. Typically, and regardless of the shape or geometry of the container, one end or side of the ULD is open for loading and unloading cargo. Various door closures can be used for opening and closing the open ends ULDs. The unloaded weight of the ULD significant as even a slight reduction in the unloaded weight of the ULD will result in substantial savings in the cost of fuel to transport the ULD over its life. In addition, a reduction in the unloaded weight of the ULD will allow for an increased weight capacity for cargo.

Transporting perishable air cargo may require a ULD to be insulated and/or refrigerated. Some perishable air cargo may require an interior of a ULD to be maintained below a specific temperature or within a specific temperature range. Typically to insulate a ULD, insulated panels including foam cores or foam cores with air pockets have been used to achieve a suitable R-value. The foam cores generally have an R-value of R-5 per inch and tend to be thick, e.g., at least 1 inch, to achieve a suitable R-value. The thickness of the panels may reduce cargo space within a ULD and/or increase an unloaded weight of the ULD. Generally, to refrigerate a ULD, specialized refrigeration equipment that is certified for use in aircraft is used and disposed within the ULD or secured to the ULD. The specialized refrigeration equipment can also include batteries that are certified for use in aircraft. The refrigeration equipment and batteries tend to be heavy and bulky increasing the weight of the ULD and reducing cargo space of a ULD.

SUMMARY

The ULDs disclosed herein include a vacuum insulated composite structural panels that have suitable R-values for transporting perishable air cargo, have reduced unloaded weight when compared to typical insulated panels, have reduced thickness when compared to typical insulated panels, and maintain panel toughness and stiffness. The disclosed panels may have an R-value greater than R-15 per panel and may have an R-value greater than R-45 per panel.

The increased R-value allows for a vacuum insulated panel of the same R-value to have a thickness 50% to 90% less than a foam core panel having a similar R-value. The reduction in thickness may decrease a weight of the vacuum insulated panel compared to a foam core panel. The reduction in thickness and/or weight may allow for increased cargo capacity of a ULD constructed with vacuum insulated panels.

In an embodiment of the present disclosure, a thermally insulated panel includes a first skin, a second skin spaced apart from the first skin, and a core that is disposed between and bonded to the first skin and the second skin such that the core transfers loads between the first skin and the second skin. The core includes a porous filler material that has a vacuum drawn therein such that the core resists transfer of thermal energy through the panel.

In embodiments, the panel includes a first barrier between the first skin and the core and a second barrier between the second skin and the core. The first and second barriers sealing the core such that a core vacuum is maintained within the core. The core may include a foam core that is bonded to the first skin and the second skin. The foam core encapsulating the porous filler material therein. The first and second barriers seal the foam core such that a core vacuum is maintained within the foam core. The panel may include a third barrier disposed about the porous filler material such that the porous filler material is encapsulated within the third barrier. The third barrier may be disposed within the foam core. The porous filler material may have a filler vacuum therein that is greater than the core vacuum.

In some embodiments, the panel includes a vacuum port that is secured to the first skin or the second skin. The vacuum port may be in fluid combination with the foam core and configured to allow the core vacuum to be drawn within the foam core after the panel is constructed. The panel may include a vacuum indicator that is configured to provide indicia of a desired vacuum within the panel. The vacuum indicator may be disposed within the porous filler material to provide indicia of a desired vacuum within the porous filler material or may be disposed in the vacuum ort to provide indicia of a desired vacuum within the foam core. The vacuum indicator may be mechanical or electrical. The vacuum indicator may be configured to provide wireless, wired, or mechanical monitoring of a vacuum within the porous filler material or the foam core.

In certain embodiments, the panel includes a barrier that encapsulates the porous filler material such that the porous filler material such that the porous filler material has a filler vacuum therein. The core may include a foam core that is bonded to the first skin and the second skin. The foam core may encapsulate the porous filler material therein. The first and second barriers may seal the foam core such that a core vacuum is maintained within the foam core.

In particular embodiments, the first and second skin are joined at edge portions of the panel. The first and second skins may form a seal with one another in the edge portions to seal the core.

In some embodiments, the panel may include a rigid frame that is disposed about edge portions of the core and is disposed between the first skin and the second skin. The rigid frame may include a frame pocket that is defined therein. The frame pocket may have a frame vacuum defined therein. The frame pocket may be in fluid communication with the core such that a vacuum within the core is equalized with the frame pocket. The frame pocket includes a microporous frame filler material. The rigid frame may define a C-profile with the core received within the C-profile of the rigid frame.

In particular embodiments, the core includes an internal porous structure that includes at least one of a plurality of randomly oriented tubes, a plurality of stacked tubes parallel to the first skin and the second skin, a repeating honeycomb structure extending perpendicular to the first skin and the second skin, a porous foam, or combinations thereof. The porous filler material may be disposed within the internal porous structure.

In another embodiment of the present disclosure, a thermally insulated container includes a first thermally insulated panel as detailed herein and a second thermally insulated panel as detailed herein. The first panel has a first edge portion and the second panel has a second edge portion. The first and second edge portions secure the first panel relative to the second panel such that the first and second panels define a cargo space therebetween.

In another embodiment of the present disclosure, a method includes forming a core with a porous filler material therein, applying a first skin over the core, applying a second skin over the core, and sealing edge portions of the core such that the core is sealed within the first and second skins. The porous filler material has a vacuum defined therein.

In another embodiment of the present disclosure, a thermally insulated panel for a container includes a first skin, a second skin, and an envelope positioned between the first and second skins. The second skin is spaced apart from the first skin and is joined with the first skin at edge portions thereof. The first and second skins forming a seal with one another in the edge portions to define a sealed pocket therein. The pocket having a vacuum therein.

In embodiments, the panel includes an envelope positioned between the first and second skins. The pocket may be defined within the envelope. The first and second skins may encapsulate the envelope. The envelope may be secured directly to each of the first skin and the second skin. The panel may include a port that is secured to the first skin or the second skin. The port may include a resealable passageway that is in communication with the pocket. The passageway may be configured to permit a vacuum to be drawn within the pocket.

In some embodiments, the panel includes a vacuum indicator secured to the first or second skin. The vacuum indicator is in communication with the pocket and is configured to provide indicia of a desired vacuum within the pocket. The vacuum indicator may be mechanical and configured to provide visual indicia of a desired vacuum within the pocket. Additionally or alternatively, the vacuum indicator may be electrical and configured to provide visual indicia of a desired vacuum within the pocket.

In certain embodiments, the panel includes struts disposed within the envelope. Each strut may extend in a direction from the first skin towards the second skin and be configured to maintain a distance between the first and second skins. The struts may form a honeycomb structure between the first and second skins. Each strut may define or contain a portion of the pocket therein. The panel may include a filler material disposed within the portion of the pocket. The filler material may be configured to provide rigidity to the strut. The filler material may be a porous fabric or foam. Each strut may include a passage in communication with an adjacent strut such that vacuum equalization occurs within the entire pocket. The panel may include a port and/or a vacuum indicator as indicated above that is in communication in the pocket.

In particular embodiments, the panel includes a foam core disposed between the first and second skins. The pocket may be defined within the core. The panel may include an envelope disposed within the core and about the pocket. The panel may include a filler material within the envelope that is configured to prevent the envelope from collapsing. The filler material may be a porous fabric or foam.

In some embodiments, the edge portions are formed to secure to a frame or an adjacent panel. The envelope may form a seal in each of the edge portions to seal the pocket. The skins may form a seal within one another in each of the edge portions to seal the envelope therewithin.

In another embodiment of the present disclosure, a thermally insulated container includes a first thermally insulated panel and a second thermally insulated panel that define a cargo space therebetween. The first and second thermally insulated panels may be any of the thermally insulated panels detailed herein.

In embodiments, the container includes a frame disposed about the cargo space. The first and second panels may each be secured to the frame.

In some embodiments, the container includes a third thermally insulated panel. The third thermally insulated panel may be any of the thermally insulated panels detailed herein. The third thermally insulated panel may be secured directly to each of the first and second panels.

In another embodiment of the present disclosure, a method of manufacturing a thermally insulated panel includes applying a first skin over a core, applying a second skin over the core, thermoforming edge portions of the first and second skins and the core, and establishing a vacuum within the pocket after thermoforming edge portions of the first and second skins. Thermoforming the first and second skins include the first and second skins forming a seal therebetween and forming a sealed pocket therewithin. The core is within the pocket.

In embodiments, the method includes installing a port to one of the skins, the port may include a resealable passageway in communication with the pocket. Establishing a vacuum within the pocket may include drawing a vacuum through the passageway of the port to establish a vacuum within the pocket. Drawing the vacuum through the passageway of the port may occur after encapsulating the envelope within the skins.

In some embodiments, the method includes installing a vacuum indicator one of the skins. The vacuum indicator may be configured to provide indicia of a desired vacuum within the pocket.

In certain embodiments, the method includes applying an envelope over the core before applying the first and second skins over the core. Applying the first skin over the core may include applying the first skin over the envelope. Applying the second skin over the core may include applying the second skin over the envelope.

In another embodiment of the present disclosure, a thermally insulated panel includes a first skin, a second skin, a rigid frame, and a porous core. The rigid frame is disposed between the first skin and the second skin. The porous core is disposed between the first skin and the second skin with the frame surrounding the core. The core encapsulated to from a pocket. The pocket at a vacuum to thermally insulate the panel.

In embodiments, the panel includes a barrier that is positioned between the first and second skins. The pocket defined within the barrier. The barrier may be secured directly to each of the first skin and the second skin. The barrier may be secured directly to the frame and the core.

In some embodiments, the panel includes a filler material disposed within the core. The filler material may include fiberglass mats, silica, or a combination thereof.

In certain embodiments, the panel includes a port that is secured to the first or second skin. The port may include a resealable passageway that is in communion with the pocket. The passageway may be configured to permit a vacuum to be drawn within the pocket. The port may include a vacuum indicator that is in fluid communication with the pocket. The vacuum indicator is configured to provide indicia of a desired vacuum within the pocket. The vacuum indicator may be mechanical and configured to provide visual indicia of a desired vacuum within the pocket. The vacuum indicator may be electrical and be configured to provide visual indicia of a desired vacuum within the pocket.

In particular embodiments, the core may include a plurality of rigid tubes. The rigid tubes may be randomly orientated within the core. The rigid tubes may be stacked in an orientation parallel to the skins. The core may include a honeycomb structure that extends between the first skin and the second skin. The honeycomb structure may include holes in walls thereof such that vacuum equalization occurs within the pocket.

In some embodiments, the frame includes edge portions that are configured to attach to a container frame or an adjacent panel. The edge portion may be integrally formed with the frame or are releaseably secured to the frame. The frame may define a sealed frame pocket that has a vacuum drawn therein. The frame pocket is in fluid communication with the pocket. The frame may include frame elements and joint elements that are bonded together to form the frame. The frame may define a shape of the panel. The frame may have a C-profile that receives the core therein.

In another embodiment of the present disclosure, a thermally insulated container includes a first thermally insulated panel as detailed herein, a second thermally insulated panel as detailed herein. The first and second panels defining a cargo space therebetween.

In embodiments, the container includes a container frame that is disposed about the cargo space. The first and second panels may each be secured to the frame. The container may include a third thermally insulated panel as detailed herein. The third panel may be secured directly to each of the first and second panels.

In another embodiment of the present disclosure, a method of manufacturing a thermally insulated panel includes applying a first skin over a first side of a core and a frame, applying a second skin over a second side of the core and the frame, laminating the first skin, the second skin, the core, and the frame to form a sealed pocket therein, and establishing a vacuum within the pocket after laminating. The second side of the core and the frame opposite the first side. The core is sealed within the pocket.

In embodiments, the method includes installing a port in one of the first or second skins. The port may include a resealable passageway in fluid communication with the pocket. Establishing a vacuum within the pocket may include drawing a vacuum through the passageway of the port to establish a vacuum within the pocket.

In some embodiments, the method includes applying a first barrier over the first side of the core and the frame such that the first skin is applied to the first barrier and applying a second barrier over the second side of the core and the frame such that the second skin is applied to the second barrier.

In another embodiment of the present disclosure, a method of repairing a vacuum insulated panel includes locating a damaged area of a vacuum insulated panel, applying a patch over the damaged area of the vacuum insulated panel to seal a pocket of the vacuum insulated panel, and drawing a vacuum within the pocket after applying the patch over the damage area.

In some embodiments, applying the patch over the damaged area includes laminating the patch to a skin of the vacuum insulated panel.

Further, to the extent consistent, any of the embodiments or aspects described herein may be used in conjunction with any or all of the other embodiments or aspects described herein.

BRIEF DESCRIPTION OF THE DRAWINGS

Various aspects of the present disclosure are described hereinbelow with reference to the drawings, which are incorporated in and constitute a part of this specification, wherein.

DETAILED DESCRIPTION

Figure 1:
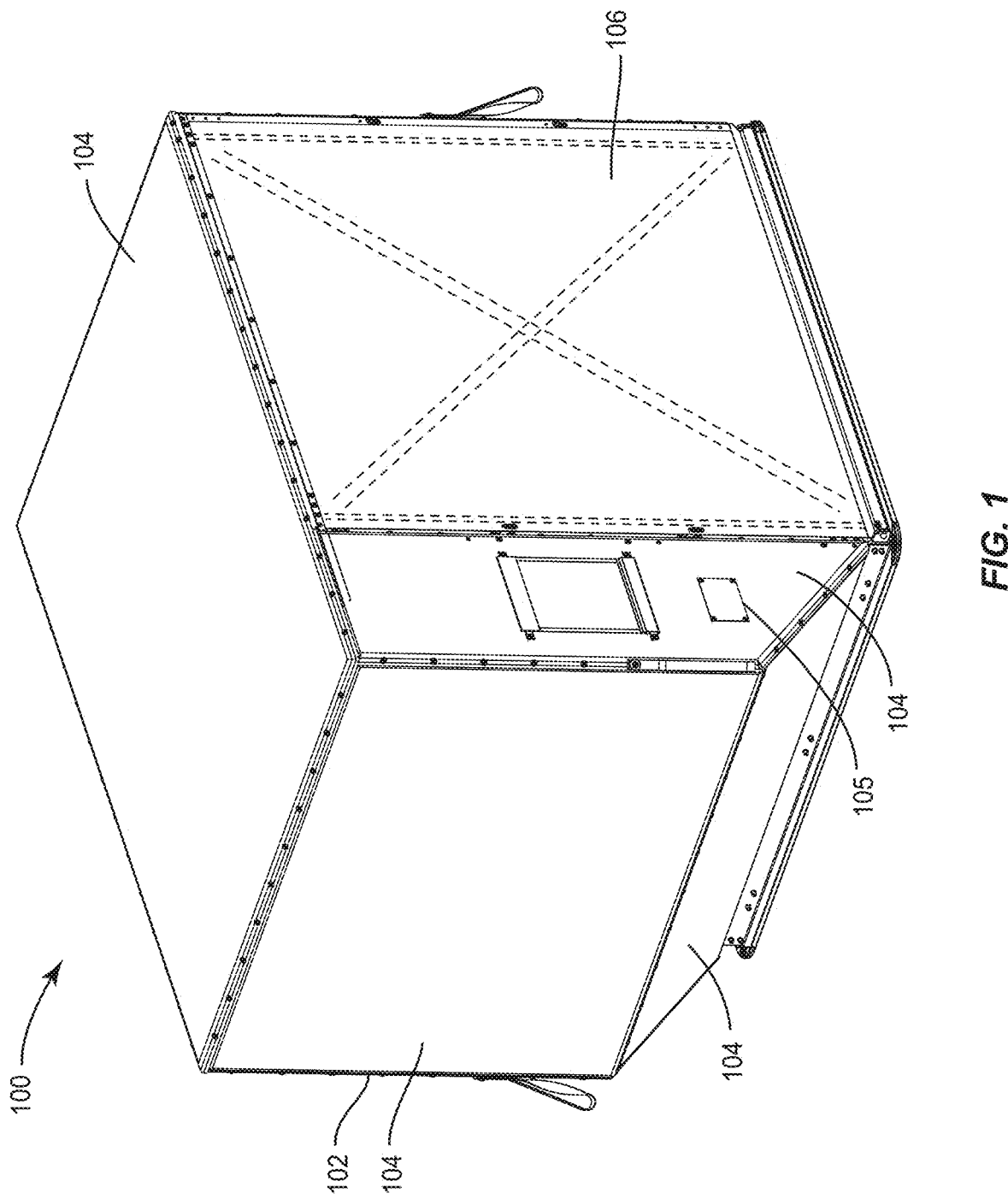
FIG. 1 is a perspective view of an air cargo container according to an embodiment of the present disclosure.

The present disclosure will now be described more fully hereinafter with reference to example embodiments thereof with reference to the drawings in which like reference numerals designate identical or corresponding elements in each of the several views. These example embodiments are described so that this disclosure will be thorough and complete, and will fully convey the scope of the disclosure to those skilled in the art. Features from one embodiment or aspect can be combined with features from any other embodiment or aspect in any appropriate combination. For example, any individual or collective features of method aspects or embodiments can be applied to apparatus, product, or component aspects or embodiments and vice versa. The disclosure may be embodied in many different forms and should not be construed as limited to the embodiments set forth herein; rather, these embodiments are provided so that this disclosure will satisfy applicable legal requirements. As used in the specification and the appended claims, the singular forms "a," "an," "the," and the like include plural referents unless the context clearly dictates otherwise. In addition, while reference may be made herein to quantitative measures, values, geometric relationships or the like, unless otherwise stated, any one or more if not all of these may be absolute or approximate to account for acceptable variations that may occur, such as those due to manufacturing or engineering tolerances or the like.

As used in the description and the appended claims, the phrases "unit load device" (ULD) or "air cargo container," is defined as containers used to load luggage, freight, mail, and the like on aircraft including wide-body aircraft and narrow-body aircraft. While the containers described herein are directed to ULDs for use with aircraft, it is contemplated that cargo containers including the disclosed vacuum insulated panels may be used in other transportation vehicles such as trucks, trailers, ships, or trains such that the described use with aircraft should not be seen as limiting. In addition, while the panels described herein are described with respect to forming air cargo containers, it is contemplated that the panels described herein may be used with other transportation vehicles or as structural panels for construction such as interior or exterior walls, refrigerator panels, etc. As used herein, the term "vacuum" refers to a pressure of $3 \times 10^3$ Pa or less.

The temperature of cargo within a ULD designed with thermal insulation properties in mind may extend how long cargo is able to maintain a desired internal temperature. The desired internal temperature may be above or below an ambient temperature. Specifically, while an aircraft idles on the ground waiting to take off, during flight, and during unloading of the aircraft. In addition, a thermally insulated ULD may maintain an internal temperature range with a decreased amount of passive temperature control material, e.g., dry ice, or a decreased size of active cooling/heating equipment, e.g., refrigeration/heating equipment.

Referring now to FIG. 1, an exemplary air cargo container or ULD is provided in accordance with the present disclosure and is referred to generally as container 100. As shown, the container 100 is a half-with ULD for use below a deck of an aircraft. The container 100 may be designed to load luggage, freight, or mail in an aircraft. In this regard, the cargo container 100 may have other shapes for a position within a given aircraft or for a type of a given aircraft. The container 100 may be configured as a full-width ULD. The container 100 may include a frame 102 presenting a generally rectangular shape with an offset designed to more closely follow the outline of the aircraft. The container 100 may further include a cargo opening defined by a portion of the frame 102. The frame 102 may be formed from any substantially rigid material, such as aluminum, steel, composites, temperature resistant plastics, other metals, or other non-metals.

The frame 102 may support a plurality of panels 104 forming the walls, and optionally the roof and floor of the container 100. In some embodiments, the panels 104 may be constructed together such that a separate frame, e.g., frame 102, may be eliminated. The panels 104 will be described in greater detail below and are designed for lightweight, thermal insulating, and high strength characteristics. The cargo opening may be substantially sealed, and selectively closed, by a door 106. The door 106 may be a rigid door or may be a flexible door or curtain. When the door 106 is a rigid door, the door 106 may have similar construction to any of the panels detailed below. Alternatively, the door 106 may be insulated in another manner allowing the door 106 to be flexible. For additional detail on flexible insulated doors or curtains for use with a ULD, reference can be made to U.S. Patent Publication No. 2017/0096295, the entire contents of which are hereby incorporated by reference. In addition, the frame 102, the panels 104, and/or the door 106 may be fire resistant.

Figure 2:
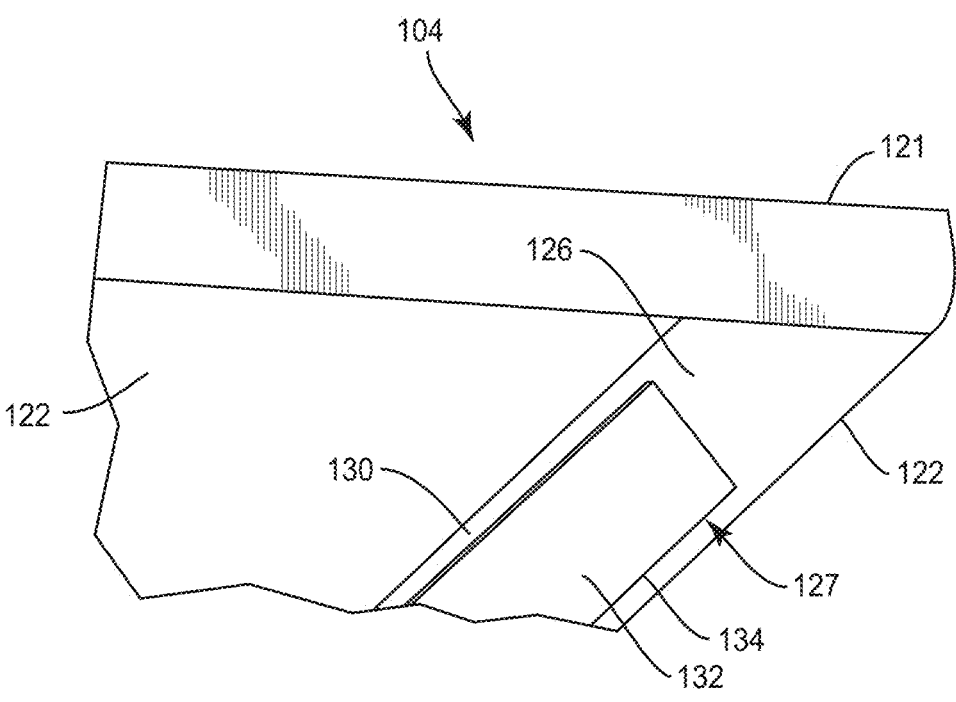
FIG. 2 is a partial, schematic sectional, perspective view of a thermally insulated panel of the container of FIG. 1.

With additional reference to FIG. 2, the panel 104 includes skins 122, a foam core 126, and a vacuum insulated panel (VIP) 130. The skins 122 may be formed of fibers embedded in a resin that binds the fibers together. Suitable fibers may include fiberglass, basalt/mineral fibers, aramid cloth, mat and non-wovens (e.g., Nomex®, Kevlar®, or Technora® s), carbon fibers, ceramic fibers, or quartz fibers.

The fibers of the skins 122 may be laid up in a unidirectional pattern, can be woven, knit, or formed as a non-woven web. Bulk properties are then generated by the number of layers and the fiber angle of each layer compared to the other layers. The thickness of the skins 122 can be discretely changed by varying the number of layers, or by the thickness of each individual layer, or by a combination of both. All layers can be of the same fiber material or can be of different fiber blends.

The resin is used to bind the fibers together to form the rigid skins 122. The resin may include phenolic and polyimides including bismaleamides, epoxies, polyesters, or vinyl esters. The resin may also include polyphenylene sulfide and similar sulfides, polyether imide, polyamide imide, polyetheretherketone, polypropylene, nylon, polyester, or other thermoplastics.

The core 126 is laminated between the skins 122 such that the skins 122 and the core 126 are prevented from sliding or shifting relative to one another in a length or width direction of the panel 104. The skins 122 and the core 126 may be secured or attached together in various ways. For example, the skins 122 may be adhered to the core 126 by the resin. Additionally or alternatively, the panel 104 may include fibers inserted through the skins 122 and the core 126. For additional detail on suitable fibers, reference may be made to U.S. Pat. No. 8,002,919, the entire contents of which are hereby incorporated by reference. In some embodiments, the skins 122 and the core 126 may be attached by a coating and/or an adhesive on a surface of the skins 122 in contact with the core 126 and/or on surfaces of the core 126 in contact with the skins 122.

The core 126 includes a pocket 127 defined therein. The pocket 127 is positioned such that the core 126 surrounds the pocket 127 on all sides. The pocket 127 extends towards each edge of the panel 104 such that the pocket 127 is defined substantially at all points between the skins 122. The VIP 130 is embedded within the pocket 127.

The VIP 130 includes a filler material 132 and a barrier or envelope 134. The filler material 132 may be a porous fabric or a porous foam material. The envelope 134 is disposed over the filler material 132 such that the filler material 132 is hermetically sealed within the interior of the VIP 130. The envelope 134 may be a thin metallic layer, e.g., an aluminum layer, that is impenetrable. During manufacturing of the VIP 130, a vacuum is applied such that when the envelope 134 is sealed over the filler material 132, the envelope 134 holds a vacuum therewithin. The filler material 132 prevents the envelope 134 from collapsing and maintains a volume within the envelope 134. The VIP 130 may have an R-value above R-15 per inch of thickness, e.g., R-20, R-30, R-40, R-45, or R-50 per inch of thickness. The skins 122 and the core 126 provide protection to the envelope 134 to prevent the seal of the envelope 134 from being compromised and thus, prevent the VIP 130 from losing its vacuum.

Continuing to refer to FIG. 2, to manufacture the panel 104, a VIP 130 may be created having dimensions substantially equal to the finished panel 104. For example, the VIP 130 may have a length slightly less than a desired length of the finished panel 104, e.g., 2 inches to 12 inches less, and may have a width slightly less than a desired width of the finished panel 104, e.g., 2 inches to 12 inches less. The VIP 130 may have a thickness substantially equal to the thickness of the finished panel 104, e.g., 70 percent to 90 percent of the thickness of the finished panel.

The VIP 130 is embedded within the core 126. Specifically, the core 126 may be formed about the VIP 130 such that the VIP 130 is embedded within the pocket 127 of the core 126. The VIP 130 and the core 126 may be bonded together such that the VIP 130 and the core 126 have a shear strength of 5 lb./ft.$^2$.

The skins 122 are applied over the core 126 to encapsulate the entire core 126. In some embodiments, the skins 122 are laid over the core 126 as one or more fiber sheets or layers and then the resin is poured over or distributed through the fiber sheets or layers to form the skins 122 and/or to bond the skins 122 to the core 126.

Edge portions 121 of the panel 104 may be formed by thermoforming the edge portions 121 to a desired shape. Specifically, the skins 122, the core 126, and the VIP 130 may form a flat panel with substantially linear edge portions 121. The edge portions 121 may then be thermoformed to a desired shape. As shown in FIG. 2, the edge portion 121 is formed in an arc to fit over a rounded structural member of the frame 102 (FIG. 1) or over a rounded edge portion of another panel, e.g., panel 104. Thermoforming the edge portions 121 also joins the skins 122 to one another such that a seal is formed between the skins 122 which encapsulates the core 126 within the skins 122. The seal between the skins 122 may prevent air from escaping an interior of the panel 104, e.g., the core 126, or from entering the interior of the panel 104, e.g., vacuum escaping the panel 104.

Figure 3:
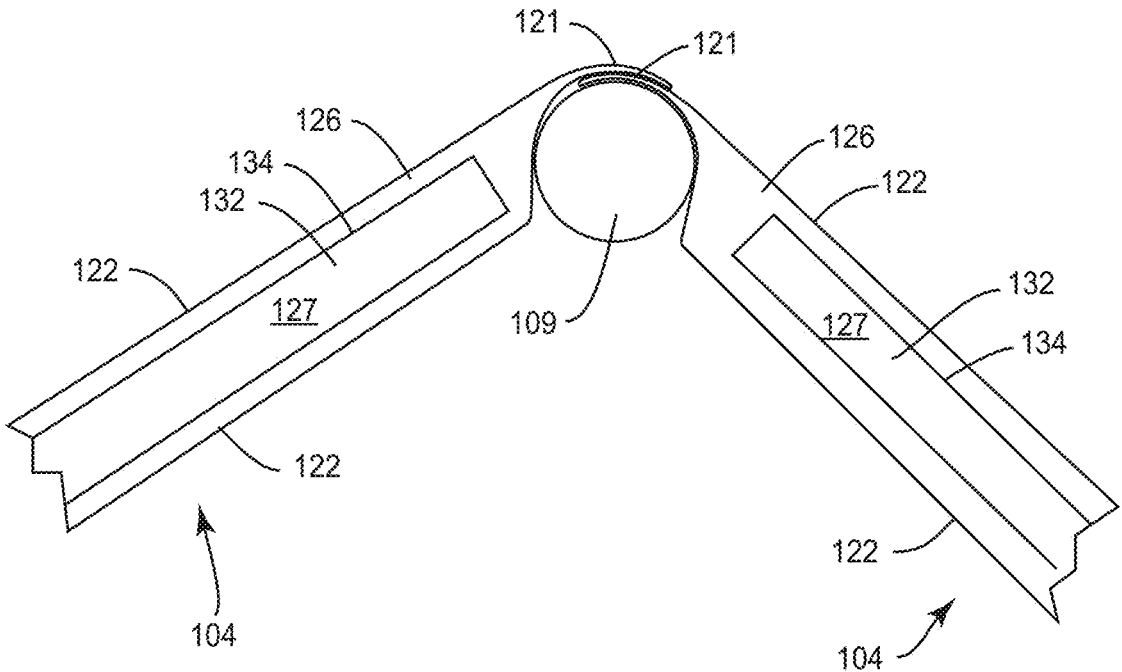
FIG. 3 is a cross-sectional view of a corner of the container of FIG. 1.

With additional reference to FIG. 3, the edge portion 121 of one panel 104 may secure to the edge portion 121 of another panel 104 with a tubular insert 109 received at the joint. The tubular insert 109 may be vacuum insulated and/or foam insulated such that a completed container 100 has edge-to-edge insulation for each panel 104. The tubular insert 109 may be compressed within the edge portions 121 of the adjacent panels 104 to secure the tubular insert 109 between the edge portions 121. In some embodiments, the shape of the edge portion 121 allows the edge portion 121 of the panel 104 to be secured to a tubular frame member. The edge portions 121 may include one or more openings (not shown) to allow fasteners to pass through the edge portion 121 to secure the edge portions 121 to the frame 102 and/or to another panel 104.

Figure 4:
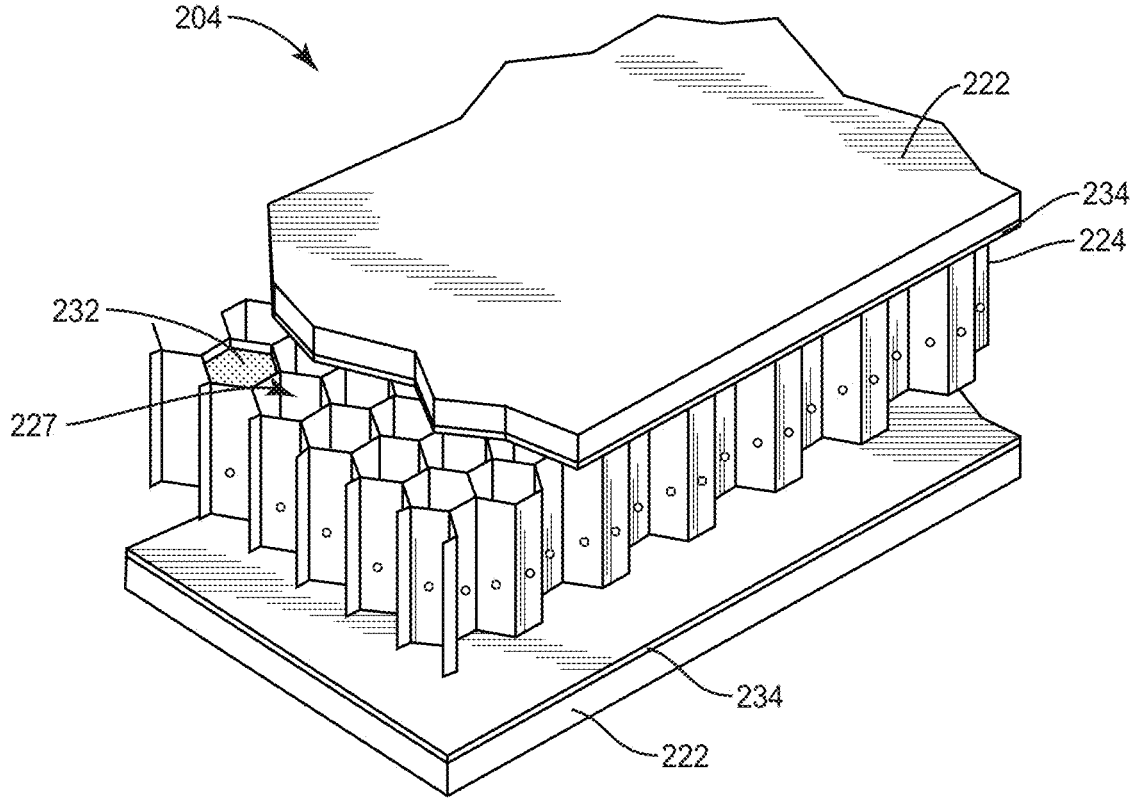
FIG. 4 is a partial perspective, schematic cutaway view of a central portion of another exemplary thermally insulated panel for use with the container of FIG. 1.

Referring now to FIG. 4, another panel 204 is provided in accordance with the present disclosure and may be used as one or more sides of a ULD, e.g., container 100 (FIG. 1). The panel 204 includes skins 222 and struts 224. The skins 222 are similar to the skins 122 detailed above and as such will not be detailed below for brevity. The panel 204 may also include an envelope 234.

The struts 224 are positioned to define a space or pocket 227 between the skins 222. As shown, the struts 224 form a honeycomb structure with each honeycomb structure defining a portion of the pocket 227. The struts 224 are covered by skins 222 which seals the pocket 227 such that the struts 224 form a rigid structure to prevent the skins 222 from shifting in a length or width direction or from collapsing. While the struts 224 are shown as honeycomb structures, the struts 224 may be cylindrical with a pocket, e.g., pocket 227, defined therein or may be a solid column having a circular, rectangular, or polygonal cross-section. The struts 224 may be formed of a thermoplastic, e.g., thermoplastic polypropylene. Each honeycomb structure of the struts 224 includes one or more passages 230 in a sidewall thereof to allow air to pass between the portions of the pocket 227 such that the entire pocket 227 within the envelope 234 has the same vacuum, e.g., allows for vacuum equalization.

The skins 222 are configured to encapsulate the pocket 227 such that a vacuum can be drawn within the pocket 227 as detailed below. In some embodiments, the skins 222 are capable of maintaining a vacuum within the pocket 227. In certain embodiments, the panel 204 may include an envelope 234 between each of the skins 222 and the struts 224 such that the envelope 234 defines the pocket 227 and is encapsulated within the skins 222. In such embodiments, the skins 222 provide protection for the envelope 234 to prevent the envelope 234 from being damaged, punctured, or breached which would compromise the pocket 227, e.g., releasing a vacuum within the pocket.

The edge portions 221 of the panel 204 may be formed by thermoforming the skins 222, the envelope 234, and/or the struts 224 into a desired shape as detailed above with respect to the edge portions 121 of the panel 104 (FIG. 2).

The panel 204 may include a filler material 226 disposed within one or more of the portions of the pocket 227. The filler material 226 may be a porous fabric, porous foam material, or a microporous material such as fiberglass mat, fumed or precipitated silica, aerogels, or similarly effective insulation materials that allows air or vacuum to pass therethrough while providing additional strength to prevent the skins 222 and/or the envelope 234 from shifting in a length or width direction relative to one another or from collapsing towards one another. In addition, the filler material 226 may be a fire resistant material allowing the entire panel 204 to be fire resistant.

Figures 5, 6, 7:
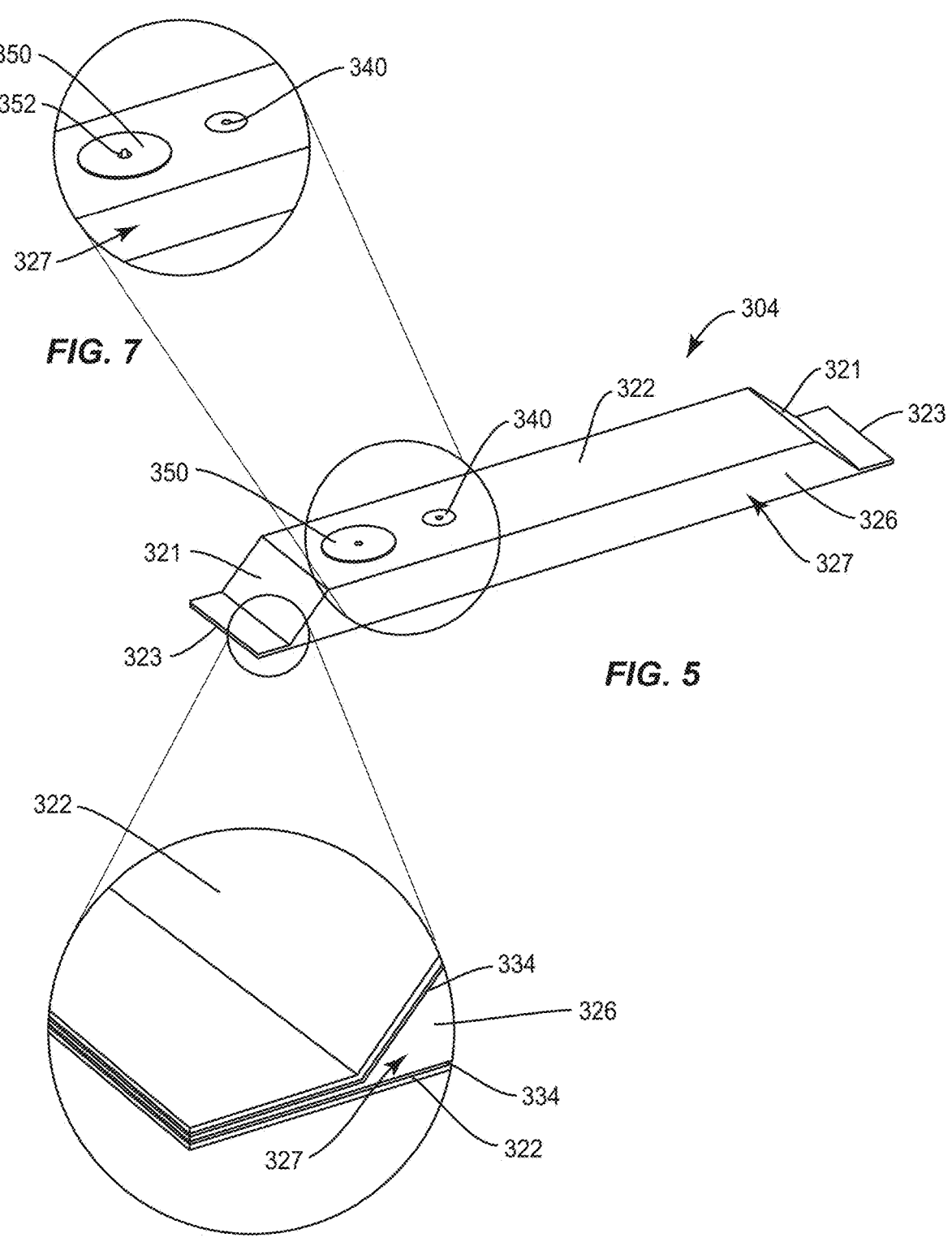
FIG. 5 is a partial, schematic sectional, perspective view another exemplary thermally insulated panel for use with the container of FIG. 1.
FIG. 6 is an enlargement of a portion of the panel of FIG. 5.
FIG. 7 is an enlargement of another portion of the panel of FIG. 5.

Referring now to FIGS. 5-7, another panel 304 is provided in accordance with the present disclosure and may be used as one or more sides of a ULD, e.g., container 100 (FIG. 1). The panel 304 includes skins 322 and a core 326. The skins 322 are similar to the skins 122 detailed above with respect to the panel 104 and will not be detailed herein for brevity. The panel 304 may also include an envelope 334.

The core 326 is formed of a porous foam that substantially fills a space or pocket 327. The core 326 may be an open cell foam, sintered bead foam, or microporous inorganic powders or fibers such that air and/or vacuum may flow through the pocket 327 to allow for vacuum equalization within the pocket 327. The core 326 provides rigidity to the pocket 327 and prevents the pocket 327 from collapsing when a vacuum is applied within the pocket 327 as detailed below.

The skins 322 are positioned about the core 326 to seal the pocket 327. The skins 322 are bonded to the core 326. The edge portions 321 of the panel 304 are thermoformed such that the skins 322 are joined together to encapsulate the core 326 within the pocket 327 and to form a seal such that the pocket 327 is hermetically sealed.

In some embodiments, the panel 304 includes an envelope 334 between the core 326 and the skins 322. The envelope 334 is impermeable and is positioned about the core 326 to hermetically seal the pocket 327. The envelope 334 may be formed a thin metallic foil or sheet, e.g., an aluminum foil or sheet. The envelope 334 is encapsulated within the skins 322 and is bonded to both the skins 322 and the core 326. The envelope 334 may include a polypropylene, polyethylene, or film adhesive coating on one or both sides to bond to the skins 322 and/or the core 326.

With particular reference to FIG. 7, the panel 304 includes a port 350 secured through one of the skins 322, and one of the envelopes 334 when present, to provide access to the pocket 327. The port 350 may be secured to a skin 322 that is configured to be disposed within an interior or cargo space of a finished container or to be disposed on an exterior of a finished container. The port 350 includes a resealable passageway 352 that extends through the port 350 and into the pocket 327. The port 350 forms a seal with the skin 322 and/or the envelope 334 as to not compromise the pocket 327. The port 350 may be adhered and/or mechanically secured to the skin 322 and/or the envelope 334. The passageway 352 may include a one-way valve (not shown) that allows airflow out of the pocket 327 and prevents airflow into the pocket 327.

The panel 304 may also include a vacuum indicator 340 that accesses the pocket 327 to indicate a vacuum within the pocket 327 without compromising the integrity of the pocket 327. The vacuum indicator 340 includes an indicator that provides visual indicia that the vacuum within the pocket 327 is at least a desired vacuum. The vacuum indicator 340 may be mechanical and/or electrical. For example, the vacuum indicator 340 may include a light that illuminates when the vacuum within the pocket 327 is at a desired vacuum and/or when the vacuum is below a desired vacuum. In some embodiments, the vacuum indicator 340 may include a mechanical switch that changes a visible color of the vacuum indicator 340 when the vacuum within the pocket 370 is at or below desired vacuum. The vacuum indicator 340 allows for a quick and nondestructive verification or inspection of the vacuum within the pocket 327 of the panel 304. The vacuum indicator 340 may be secured to the same or opposite skin 322 as the port 350. In certain embodiments, the vacuum indicator 340 provides a signal indicating an amount of vacuum within the pocket 327. For example, the vacuum indicator 340 may transmit an electronic signal that is received by a controller 105 (FIG. 1) secured to the container 100 or separate from the container 100. The controller 105 may allow for centralized verification that all the panels, e.g., panel 304, of the container 100 have a desired vacuum, the vacuum of each panel, and/or which panels are below a desired vacuum. The vacuum indicator 340 may include internal vacuum transducers disposed within pocket 327. The internal vacuum transducer may include a transmitter such as a RFID, Bluetooth®, or other wireless technologies to provide remote monitoring of a vacuum within the pocket 327. In particular embodiments, the vacuum indicator 340 provides audible indicia when the vacuum is below a desired level.

The vacuum indicator 340 and the port 350 are described for use with the panel 304; however, it is contemplated that similar vacuum indicators and/or ports may also be used with panel 104 or panel 204 detailed above and panel 400 detailed below.

Continuing to refer to FIGS. 5-7, to form the panel 304, the core 326 is cut or formed to a desired dimension of the finished panel 304. When an envelope 334 is used, the envelope 334 is then applied to both sides of the core 326. As detailed above, envelopes 334 may include coating or film adhesive to bond to the core 326. With the envelopes 334 applied to the core 326, a skin 322 is applied or secured to each envelope 334. In embodiments without envelopes 334, the skins 322 may be applied directly to the core 326.

The edge portions 321 of the panel 304 are then formed such that the skins 322 are joined together such that the pocket 327 is hermetically sealed within the skins 322. In embodiments with the envelopes 334, the envelopes 334 are also joined together such that the pocket 327 is hermetically sealed by the envelopes 334 and the skins 322 are joined together to encapsulate the envelopes 334. The edge portions 321 are formed to a desired shape depending on the construction of a particular container, e.g., container 100, as detailed above. As shown, the edge portions 321 are angled to abut edge portions of another panel without a separate frame, e.g., frame 102 (FIG. 1). The edge portions 321 may include a flange 323 that is configured to secure to another panel adjacent the panel 304 to secure the panel 304 to the adjacent panel. The flange 323 may include one or more openings to allow fasteners to pass therethrough without compromising the pocket 327. In some embodiments, the flange 323 includes fasteners disposed along one or more surfaces thereof to permanently or releaseably secure to an adjacent panel. For example, the flange 323 may include hook and loop fasteners on one or more surfaces to releaseably secure the flange 323 to an adjacent panel. In certain embodiments, the edge portions 321 may be curved in a similar manner to edge portions 121 detailed above. In some embodiments, the edge portions 321 are formed in a similar manner to the edge portions 121 (FIG. 4) such that the edge portions 321 of adjacent panels 304 can be secured together and a tubular insert, e.g., tubular insert 109, can be secured between the adjacent panels 304 to provide edge to edge insulation.

With particular reference to FIG. 7, the vacuum indicator 340 and/or the port 350 are secured through one of the skins 322 and in communication with the pocket 327. The vacuum indicator 340 and the port 350 may be installed adjacent one another or remote to one another. In embodiments, the vacuum indicator 340 and the port 350 are installed in opposite skins 322, e.g., the vacuum indicator 340 may be installed in an external skin 322 and the port 350 may be installed in an interior skin 322. In certain embodiments, the panel 304 includes multiple ports 350 and/or vacuum indicators 340. With the port 350 secured to the panel 304, an adapter (not shown) is placed in communication with the passageway 352 of the port 350. For example, the adapter may be a needle (not shown) that is passed through the passageway 352 of the port 350 and into the pocket 327. The passageway 352 forms a seal with the adapter to prevent air from passing into the pocket 327. In some embodiments, a seal is formed about the adapter, e.g., when the adapter is a needle, to prevent air from passing into or out of the pocket 327 about the adapter. In certain embodiments, the adapter forms a seal about the passageway 352 and opens a one-way valve of the passageway 352 when a vacuum is drawn through the adapter.

A vacuum is then drawn through the adapter such that a vacuum is drawn within the pocket 327. The vacuum is drawn through the adapter until the pocket 327 achieves a desired vacuum. When the pocket 327 achieves the desired vacuum, the vacuum indicator 340 may provide visual, audible, and/or electronic indicia of the desired vacuum within the pocket 327. With the desired vacuum within the pocket 327, the adapter is separated from the port 350 such that the passageway 352 reseals. If the port 350 includes a cap, the cap may be installed over the passageway 352 after the adapter is removed.

During use, the vacuum indicator 340 allows for noninvasive and instant inspection of a vacuum within the pocket 327 of the panel 304. If the vacuum within the pocket 327 is below the desired vacuum, the panel 304 may be replaced and/or repaired. It is contemplated that when a breach of the skin 322 and/or the envelope 334 of a panel 304 develops, a patch (not shown) may be applied over the breach to reseal the pocket 327. The repair may include removing a portion of the skin 322 to expose the core 326 and/or the envelope 334 and applying a patch directly to the exposed core 326 and/or envelope 334 over the breach. With the patch applied, the port 350 may be used to establish the desired vacuum within the pocket 327. The repair process may be completed on-site and may be completed with a universal patch kit. Such a repair process may allow for a reduction in inventory of repair parts. Such a reduction may reduce the cost and inventory requirements for repairs.

Figures 8, 9:
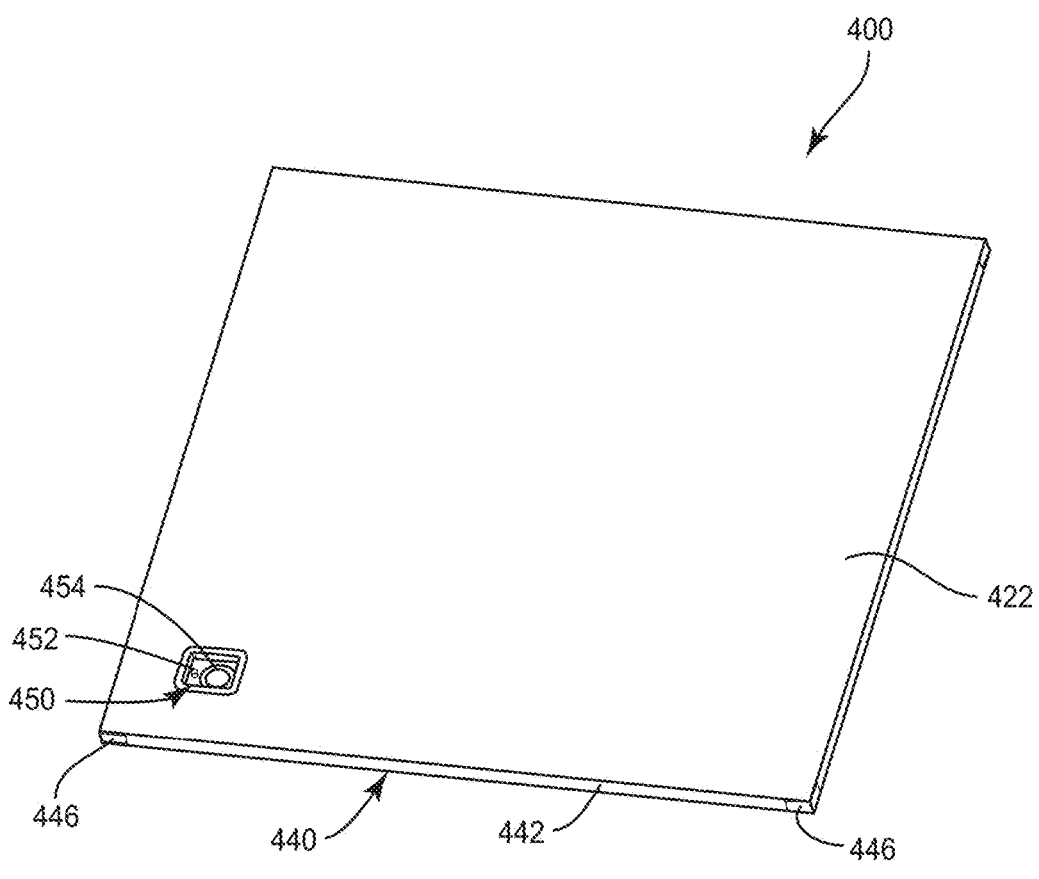
FIG. 8 is a perspective view of another thermally insulated panel according to an embodiment of the present disclosure.
FIG. 9 is a partial cross-sectional view of the panel of FIG. 8.

With reference now to FIGS. 8 and 9, another panel 400 is provided in accordance with embodiments of the present disclosure. The panel 400 includes a skins 422, a core 426, and a frame 440. The skins 422 may be composite skins similar to the skins 122 detailed above. The skins 422 and the frame 440 define a pocket 427 therewithin. The pocket 427 includes the core 426 encapsulated therein. To seal or encapsulate the core 426, the panel 400 includes a film or barrier 428 that is disposed between each skin 422 and the frame 440 such that the sealed pocket 427 is formed about the core 426. The barrier 428 is secured to an inner surface of the skin 422 and the outer surface of the frame 440 and the core 426 by an adhesive. The barrier 428 and the frame 440 hermetically seal the pocket 427 such that vacuum is maintained within the pocket 427 as detailed below. In some embodiments, the barrier 428 may be disposed within the skin 422 as detailed below.

The core 426 is formed of a material and has a structure to provide sufficient structural properties to resist a vacuum load within the pocket 427 and to effectively transfer load through a thickness of the panel 400. For example, the core 426 may have a compressive strength greater than 20 psi (138 kPa) to resist vacuum load and to prevent local structural buckling during bending of the panel 400. In addition, the core 426 may have a shear strength greater than 20 psi (138 kPa) to transfer load through a thickness of the panel 400 such that the panel 400 is capable of being used as a structural panel. In some embodiments, interlaminar friction as a result of the internal vacuum may be 15 psi such that a shear strength of the structure of the core 426 may be less than 20 psi dependent on the effectiveness of this interlaminar friction generating additional shear strength. Further, the core 426 may have a traverse tensile strength greater than 5 psi (35 kPa) to minimize cohesive failure of the core 426 which is exhibited by separation of the skins 422. The traverse tensile strength may also be assisted by the internal vacuum within the pocket 427. In addition, the core 426 may have a low thermal conductivity to minimize thermal bridging effects between the skins 422.

The pocket 427 may be void of fluid, e.g., air, such that a total vacuum is formed within the pocket 427. When a total vacuum is present within the pocket 427, the insulative benefit of the pocket 427 may be at a maximum. However, it has been discovered that when there is a slight loss of a total vacuum, e.g., a small amount of air being introduced, the insulative benefit of the pocket 427 is significantly reduced when compared to the pocket 427 being void of all fluid. It has also been discovered that by providing a non- or low conductive microporous filler material 436 within the pocket 427, the sensitivity of the insulative benefit of the pocket 427 to a slight loss of total vacuum can be increased without significantly decreasing the insulative benefit of the pocket 427. As such, the core 426 may be filled with the filler material 436 which is a non- or low conductive material as described in greater detail below.

As detailed below with respect to FIGS. 9-13, the core 426 may include an internal porous structure that extends between the skins 422 and meets the structural requirements of the core 426. The internal porous structure may be porous foam, a plurality of rigid tubes randomly oriented, a plurality of rigid tubes in a stacked orientation extending perpendicular to the skins 422, a repeating honeycomb structure extending perpendicular to the skins 422, or combinations thereof.

With particular reference to FIG. 9, the core 426 may include a porous foam such as a porous expanded polypropylene (PEPP) foams. Suitable PEPP foams may have a density of 2.8 lbs/ft³ (45 kg/m³) which have been tested to provide both the desired structural and insulative values for the core 426. The PEPP foam may be formed by bonding randomly oriented foam tubes with a length to diameter ratio less than 10 by putting the foam tubes in a mold cavity and applying heat, e.g., pressurized steam. By forming the PEPP foam in this manner allows for the introduction of a filler material 436 such as small particle silica into the voids in the tubes may decrease the sensitivity of the insulative value to vacuum levels within the core 426. In addition, PEPP foams are thermoplastic in nature, the PEPP foams are compatible with thermal lamination to the skins 422 or the barrier 428 such that a continuous lamination process may be used to form the panel 400 as detailed below.

Figure 10:
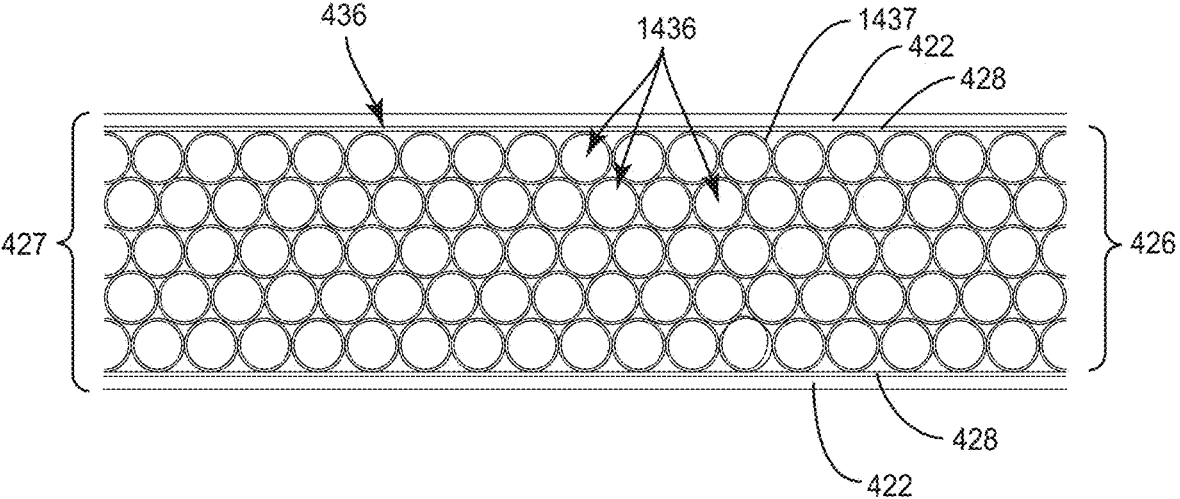
FIG. 10 is a partial cross-sectional view of a core of the panel FIG. 8 according to an embodiment of the present disclosure.

With reference to FIG. 10, the core 426 may include a porous tubular structure which is formed of rigid tubes 1436 to create a porous structure that meets the structural requirements of the core 426. The porous tubular structure is formed of polypropylene (PP) tubes 1436 that are co-extruded with a thin layer of low melting material 1437 such as polyethylene (PE) on the outer surface thereof. The PE layer 1437 serves as an adhesive to bond the PP tubes 1436 together. The length to diameter ratio of the PP tubes 1436 may be less than five to one to allow the PP tubes 1436 to form a random structure when mixed together. In addition, the outside diameter to wall thickness ratio of the PP tubes 1436 should be sufficient to meet the structural requirements of the core 426, e.g., the compressive and the shear strengths, which is dependent on the modulus of the PP forming the PP tubes 1436. When the PP tubes 1436 are disposed in a mold or a layup, the PP tubes 1436 are consolidated by heating the PP tubes 1436 to the melting point of the PE layer 1437 but not to the heat deflection temperature of the PP such that the PE layers 1437 bond together to form a structure that meets the structural requirements of the core 426. Similar to the PEPP foam, the PP tubes 1436 are compatible with the skins 422 and the barrier such that the PP tubes 1436 can be bonded to the skins 422 or the barrier 428 in a continuous lamination process. In addition, a filler material 436 such as a small particle silica can be used to fill voids within the PP tubes before consolidation of the PP tubes 1436. When a silica is used to fill voids, a radial compressive strength of each of the PP tubes 1436 can be optimized to push any of the silica from a bonding area between individual PP tubes 1436 such that a bond can be formed between adjacent PP tubes 1436.

The PP tubes 1436 may be orientated randomly within the core 426 or, as shown in FIG. 10, the PP tubes 1436 can be stacked parallel to the skins 422 to form the core 426. Such a construction is similar to a honeycomb structure lying flat instead of on edge. Such a structure may include a filler material 436 in interstitial spaces between the tubes 1436, e.g., silica. In this structure the filler material 436 may decrease sensitivity to vacuum pressure and also improve compressive and shear strength of the core 426. In particular embodiments, where a filler material 436 is not used, a ratio of the wall thickness to the outside diameter is increased to meet the structural requirements of the core 426, e.g., the compressive loading requirement. It is contemplated that stacked parallel PP tubes 1436 may have more predictable structural and thermal properties than a random version while being more cumbersome and expensive to produce. In addition, larger contact areas between tubes 1436 may create high thermal transmission through the core.

In some embodiments, a porous thermoset polyurethane (PU) foam may be used as the core 426. The thermal insulation value of an envelope with a PU foam tends to have high sensitivity to a vacuum within the pocket 427. In addition, a PU foam is not compatible with the skins 422 or the barrier 428 such that a thermoplastic film adhesive may be required to laminate the PU foam to the skins 422 or the barrier 428. In certain embodiments, a thermoset porous expanded polystyrene (EPS) may be used to form the core 425. Similar to PU foam cores, a thermoplastic film adhesive is necessary to bond the EPS to the skins 422 or the barrier 428.

Figure 11:
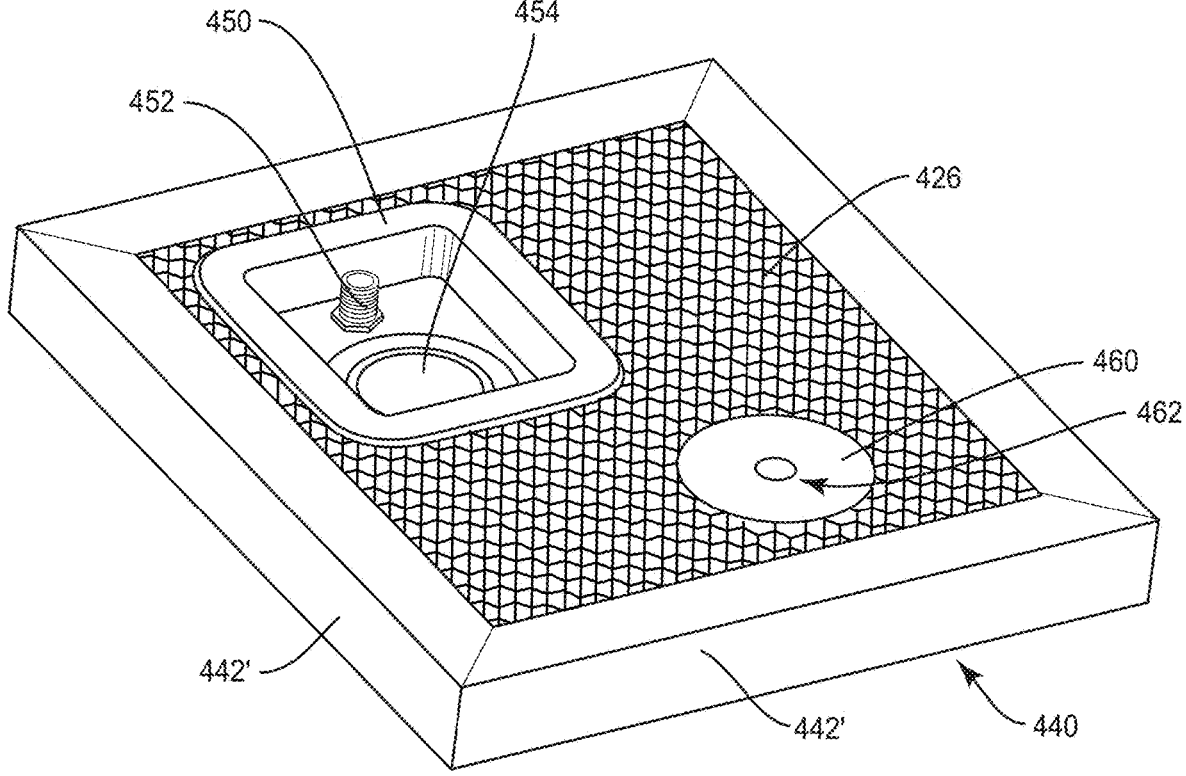
FIG. 11 is a perspective view of another thermally insulated panel according to an embodiment of the present disclosure with a skin thereof removed.
Figure 12:
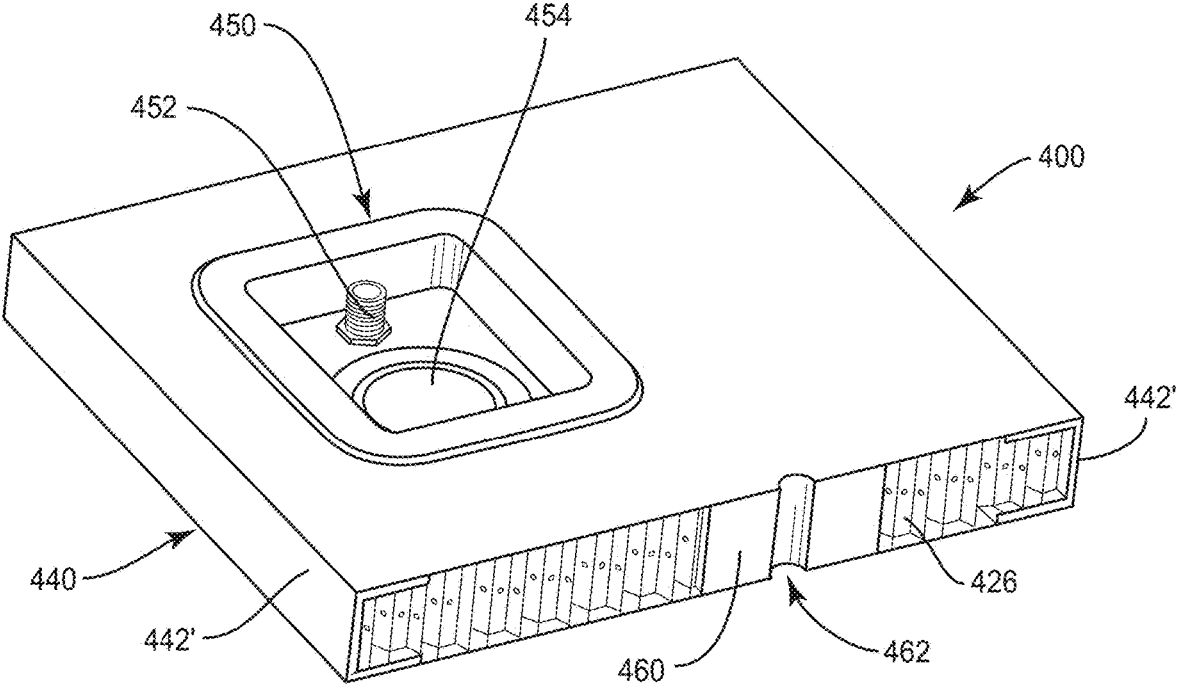
FIG. 12 is a cutaway, perspective view of the panel of FIG. 11.
Figure 13:
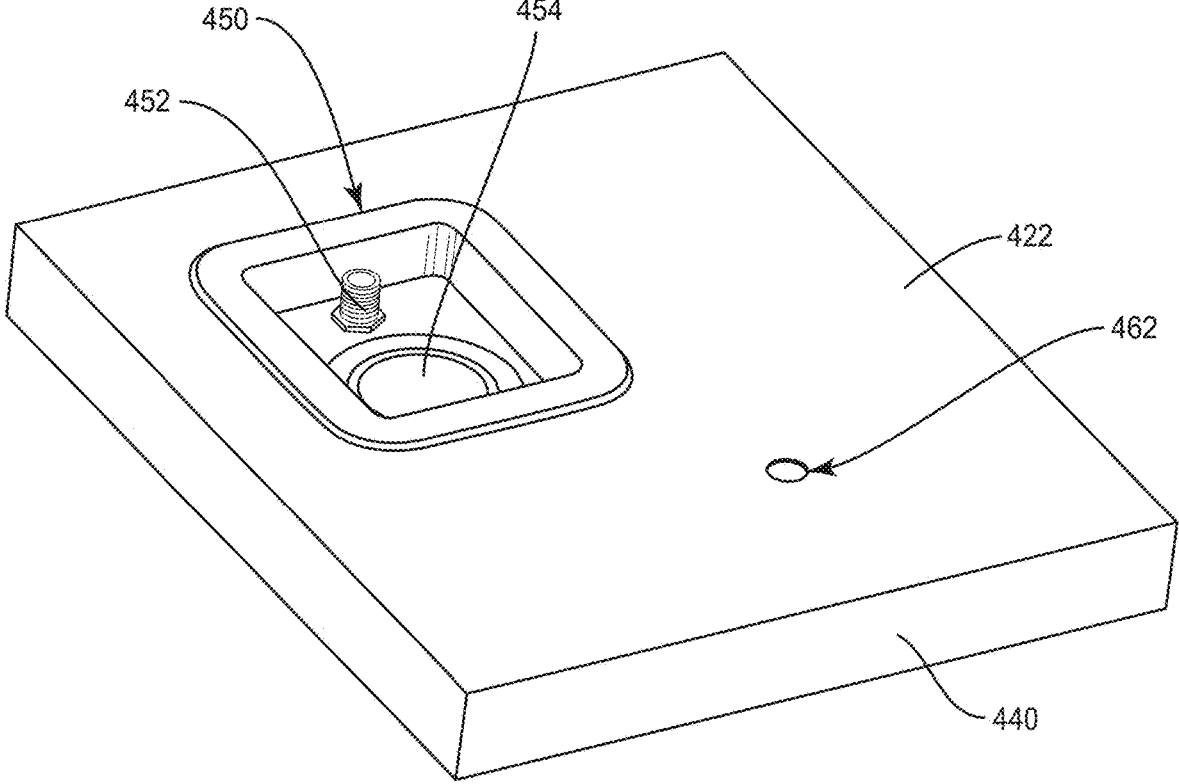
FIG. 13 is a perspective view of the panel of FIG. 11.

With reference to FIGS. 11-13, a porous thermoplastic honeycomb may be used to form the core 426. The honeycomb structure of the core 426 allows the core 426 to meet the required structural requirements detailed above. Even though the thermoplastic material forming the walls of the honeycomb is considered a thermally insulative material, in a high-performance environment such as the panels detailed herein, conduction between the skins 422 through the walls of the honeycomb can reduce thermal performance. To minimize this conduction, holes to increase the porosity of the honeycomb structure, e.g., holes 230, may provide a thermal break in the walls and reduce this conduction. Additionally or alternatively, the honeycomb structure may include multiple layers of honeycomb that are offset from one another to reduce condition between the skins 422. The offset honeycomb layers may also allow for porosity of the honeycomb structure without including holes in the walls. It is also contemplated that the honeycomb structure may be filled with a filler material 436, e.g., silica, to reduce a sensitivity of the thermal insulation of the honeycomb structure to a vacuum level. In addition, the repeating honeycomb structure may be hexagonal as shown in or may have other repeating shapes including, but not limited to, circular, triangular, rectangular, pentagonal, octagonal, or star. The shape of the honeycomb may reduce thermal conductivity between the skins 422 and the honeycombs themselves.

As noted above, the core 426 may include filler material 436 disposed within the pocket 427 which is porous such that fluid may flow within the pocket 427. Allowing fluid to flow within the pocket 427 allows fluid to be equally distributed or to be removed from the pocket 427. The filler material may be fiberglass strand mats, fumed or precipitated hydrophilic silica powder, aerogel materials, or open-cell foam. The filler material 436 may include small amounts of thermoplastic binder such as a PE emulsion or a PP emulsion which can be added to the silica, fiberglass matting, or a combination thereof. The filler material 436 may be dried to remove any residual moisture therein.

The core 426 may be heat pressed into a consolidated core 426 such that the core 426 including the filler material 436 meets the structural requirements of the core 426. During a heat press process, a binder that adheres adjacent particles or fibers forming the consolidated core 426, e.g., a PE emulsion or a PP emulsion, may softer such that the filler material 436 may flow through the consolidated core 426. It is appreciated that as the amount of binder increases, thermal conductivity through the core 426 may be increased such that for each type of core material there may be an optimal combination of binder and core material to provide the structural requirements of the core 426 and maximize the insulative value of the core 426.

In a particular embodiment, the filler material 436 is a three-dimensional loose fiberglass cloth, e.g., fiberglass woven cloth, that is interspersed with fumed or precipitated silica. The fiberglass cloth may provide the tensile and shear strength while the silica improves the insulative value of the core 426. Such a core 426 may be brittle such that when impacted the core 426 may crack which may reduce compressive and shear strength or reduce insulative performance. With such a core 426, the skins 422 may provide protection for the core 426 to prevent damage to the core 426 and to hold the core 426 together to increase the strength of a panel 400 having such a core 426. The protection provided by the skins 422 may be increased when combined with a rigid frame, e.g., frame 440. In such a panel 400, the consolidated core may be inserted into the frame 440, with the barrier 428 adhered to the frame 440 and the core 426 to form the pocket 427 therein. In some embodiments, the core 426 consists of the filler material 436 that is bound together with the binder, e.g., PP emulsion or PE emulsion.

With continued reference to FIGS. 11-13, the panel 400 may include a solid core area 460 that allows for drilling through or premade holes 462 in the panel 400. The solid core area 460 may be provided to allow for fasteners to pass through the panel 400 without compromising a vacuum within the pocket 427 of the panel 400 as described above. The solid core area 460 may allow for a fastener to secure a component to the panel 400, e.g., a refrigeration component or shelf, without compromising the vacuum of the panel 400. The solid core area 460 may be formed from a solid PP element that is inserted into the core 426. The solid core area 460 may have a diameter of at least three times a hole through or a fastener passing through the solid core area 460. In some embodiments, the solid core area 460 may be less than three times larger than a hole or fastener passing therethrough. The solid core area 460 may be bonded to the barrier 428 and/or the skins 422 such that the solid core area 460 is fixed within the panel 400.

Figure 14:
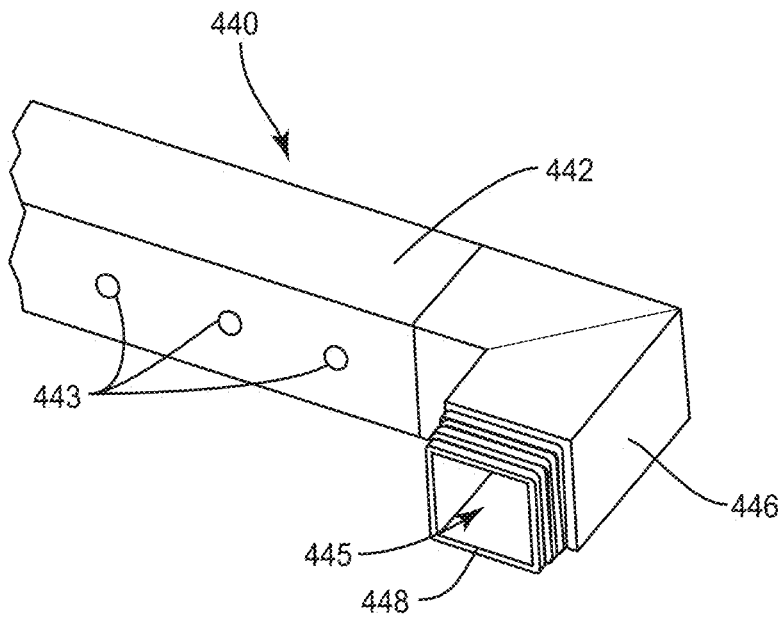
FIG. 14 is a perspective view of the frame of the panel of FIG. 8.

Referring now to FIG. 14, the frame 440 is a rigid frame that holds a predetermined shape. As shown, the frame 440 is a hollow frame that is sealed to form a frame pocket 445. The frame 440 may include openings 443 such that the frame pocket 445 may be in fluid communication with the pocket 427 of the core 426 to equalize a vacuum between the pockets 427 and 445. In addition, the frame pocket 445 may be filled with a frame filler material (not explicitly shown) which may be the same or different from the filler material of the pocket 427. The frame filler material may be a porous material such as fiberglass strand mats, fumed or precipitated silica power, aerogel materials, open-cell foam, or combinations thereof. By including a vacuum within the pocket 445 of the frame 440, the panel 440 may have a consistent edge-to-edge insulative value. This insulative value may be greater than a R-15 per inch of thickness of the panel 400, e.g., R-25, R-30, R-40, R-45, or R-50 per inch.

To form the frame 440, a frame element 442 is mated to a joint element 446 with a seal formed in a joint between the frame element 442 and the joint element 446. In some embodiments, the joint element 446 includes a connector 448 which is received in a frame element 442 to secure the frame and joint elements 442, 446 together. As shown, the connector 448 extends from the joint element 446 and is received in the frame element 442; however, this may be reversed.

The connector 448 may include one or more steps. The steps may mate with complementary steps of the frame element 442. The steps of the frame element 442 may be machined after the frame element 442 is extruded. Alternatively, the steps may have an increased amount of seal material to form primary and secondary seals or bonds with the frame element 442. Each one of the steps may include a seal material that bonds the frame element 442 to the joint element 446. The seal material may be an O-ring, an adhesive, or a combination thereof to bond the frame element 442 to the joint element 446. For example, the frame element 442 and/or the joint element 446 may be formed of a thermoplastic material that is extruded or molded into the desired shape or form and the seal material may be an adhesive such as a thermoset adhesive or a heat-activated thermoplastic adhesive. Specifically, in some embodiments, the seal material is a heat-activated thermoplastic adhesive which includes a conductive metal powder therein or added thereto such that when the frame element 442 receives the joint element 446, an inductive coil can be used to inductively heat the metal powder and the thermoplastic adhesive such that the frame element 442 is bonded to and forms a seal with the joint element 446. The thermoplastic adhesive may also include a chemical blowing agent such that when the thermoplastic adhesive is activated, the thermoplastic adhesive may expand to fill voids and enhance the seal of the joint between the joint element 446 and the frame element 442.

Figure 15:
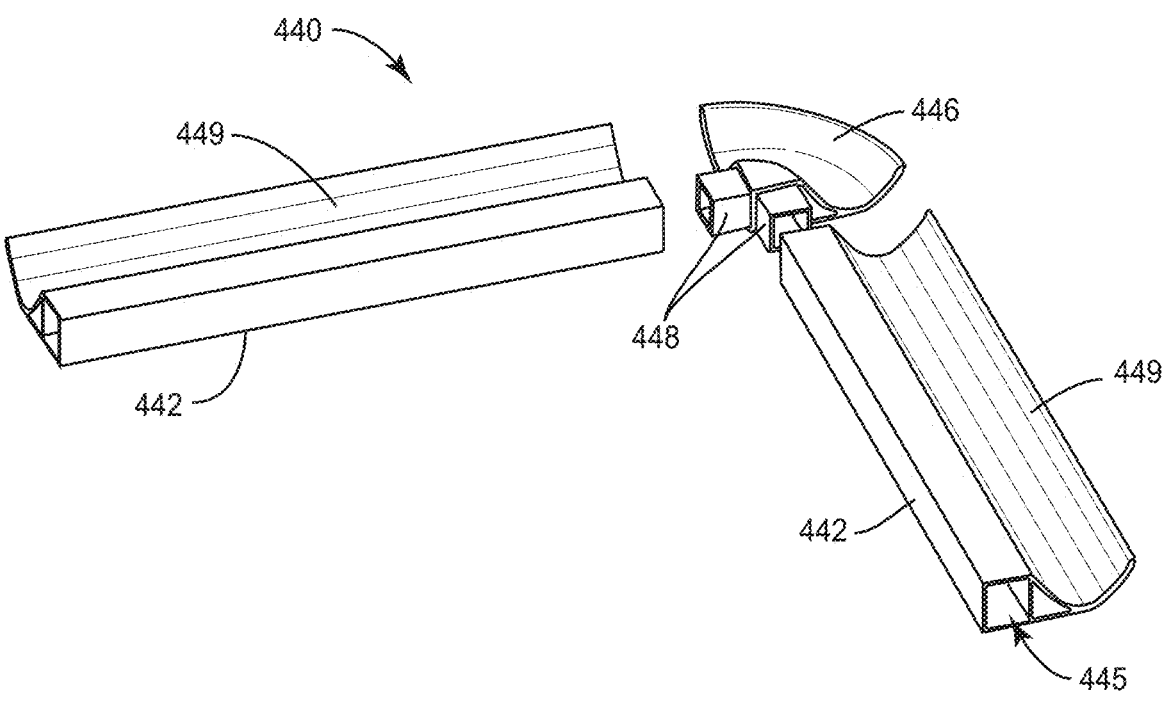
FIG. 15 is a perspective view of another frame provided in accordance with an embodiment of the present disclosure.
Figure 16:
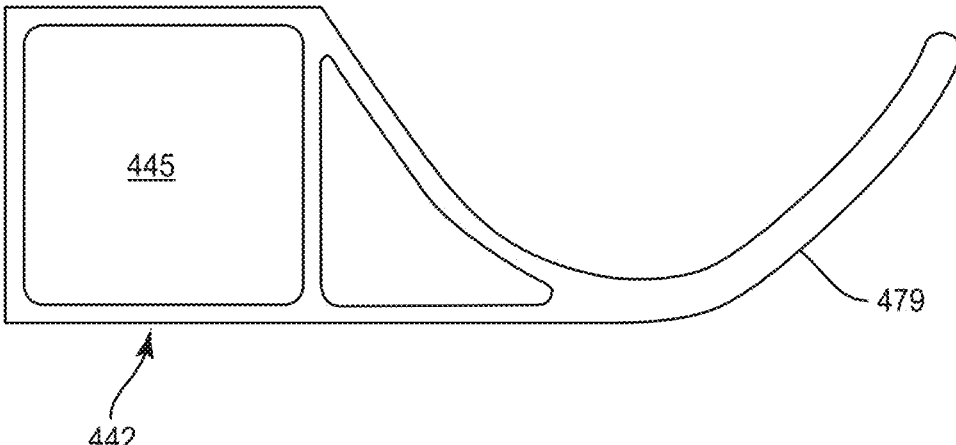
FIG. 16 is a cross-sectional view of the frame of FIG. 15.

With additional reference to FIGS. 15 and 16, the frame 440 may include an edge portions or geometry 449 that is shaped to secure the panel 400 to adjacent panels 400 or another support member. The edge geometry 449 may be configured to secure the panel 400 to other panels 400. The edge geometry 449 may be shaped to mate or be received in the edge geometry 449 of an adjacent panel 400 such that the panels 400 may be secured together by passing a fastener through the edge geometry 449 as described above. In some embodiments, a fastener may pass through the edge geometry 449 of a panel 400 and secure the panel to a frame member of a cargo container.

Figure 17:
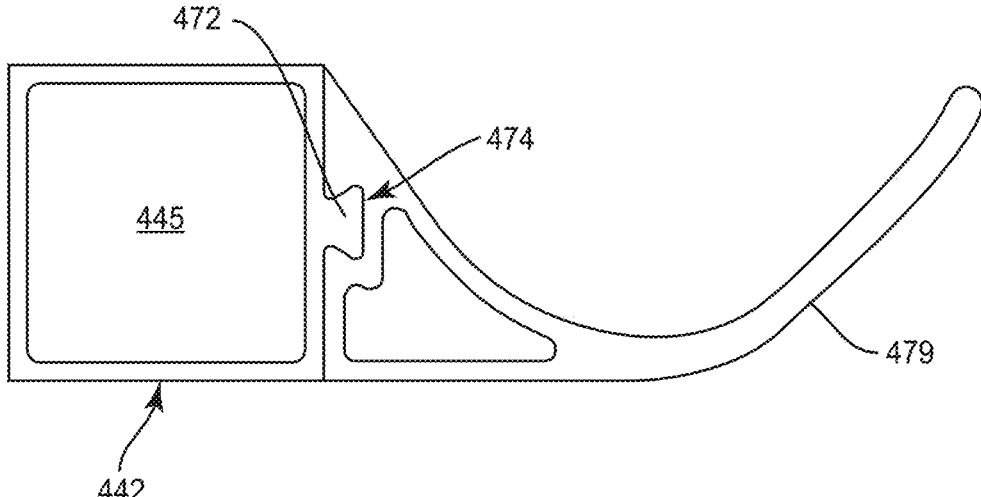
FIG. 17 is a cross-sectional view of another frame provided in accordance with an embodiment of the present disclosure.

Referring now to FIG. 17, the frame elements 442 may include detachable edge geometry 479. In such embodiments, the frame element 442 includes a connector 472, e.g., a dovetail, that is received in a receiver 474 of the detachable edge geometry 479. The edge geometry 479 may be formed manner similar to the edge geometry 449 detailed above such that the edge geometry 479 may be secured to edge geometry of an adjacent panel 400. In some embodiments, the frame element 442 defines the receiver and the detachable edge geometry includes the connector 472.

As shown the frame 440 is formed of frame elements 442 having a substantially square cross-section; however, in some embodiments the frame elements 442' may have a C-channel profile as shown in FIG. 12 with the core 426 received within the channel formed by the frame element 442'. In such embodiments, the core 426 may provide edge-to-edge insulation with the frame 440 providing reinforcement and strength to the edge of the panel.

Referring back to FIGS. 8-10, the barrier 428 may be a metalized polymer film such as polyester with a layer of hot melt adhesive on one or both sides thereof. Such a metalized polymer film has been shown to maintain a high degree of internal vacuum for an extended time, e.g., 20 years or more. The hot-melt adhesive may be a thermoplastic adhesive such as low density PE adhesive or a PP adhesive.

The barrier 428 may be placed in multiple locations relative to the core 426 and the skins 422. For example, when the materials forming the core 426 are not compatible with the skins 422, e.g., a thermoset material, the barrier 428 may be placed between the core 426 and the skins 422. In this position, the strength of the core 426 to skin 422 bond is based entirely on the strength of the adhesive. As the interface between the skins 422 and the core 426 is a high stress area, the thickness of the adhesive to create a strong bond may make a substantial difference in the overall strength of the panel 400.

Alternatively, when the material of the core 426 is compatible with the skins 422, e.g., when the core material is a thermoplastic material, or when the material of the core 426 is discontinuous, e.g., when the core 426 is a honeycomb core, the barrier 428 may be within the skin 422. Placing the barrier 428 within the skin 422 may protect the barrier 428 and may provide a higher strength bond between the skin 422 and the core 426. A possible layup for such a configuration may be a 4-ply skin which may have a layup from an internal or core side to an external side of a 0° layer/a 90° layer/the barrier 428/a 90° layer/a 0° layer/a protective outer layer. This layup places the barrier 428 within the skin 422 such that the skin 422 protects the barrier 428 and the skin 422 bonds directly to the core 426 as detailed below. The protective outer layer may be an infrared reflective layer and/or may be a waterproof layer.

The panel 400 may be formed by the following process with reference to panel 400 of FIGS. 8 and 9. The process includes forming the core 426 as detailed above. With the core 426 consolidated, the core 426 is prepared by pre-drying the core 426. Additionally or alternatively, an absorbent material, e.g., hydrophilic silica, may be applied to or positioned within the core 426 to eliminate any internal moisture or fluids therein. With the core 426 prepared, the frame 440 is placed or formed around the core 426 such that the core 426 is within the frame 440. The frame 440 may be formed in a manner consistent with the description above.

With the core 426 within the frame 440, a barrier 428 is applied over both sides of the frame 440 and the core 426. The skins 422 are then applied over the barrier 428 such that the barriers 428, the core 426, and the frame 440 are between the skins 422. In embodiments, the barriers 428 are within the skins, the skins 422 are applied directly over the frame 440 and the core 422. As detailed above, the barrier 428 may include a thermoplastic adhesive on both sides thereof such that the barriers 428 are bonded on one side, e.g., an internal side, to the core 426 and the frame 440 and on the other side, e.g., an external side, to the skin 422. With the core 426 and the frame 440 sandwiched between the barriers 428, which are sandwiched between the skins 422, the panel 400 is formed by thermally laminating the skins 422 to the barriers 428 and the barriers to the core 426 and the frame 440. This lamination process may be a single lamination process to form the panel 400. When the panel 400 is thermally laminated, the barriers 428 and the frame 440 form the pocket 427 within the skins 422.

Continuing to refer to FIGS. 8 and 9, with the panel 400 formed, a vacuum port 450 is bonded into the panel 440. The vacuum port 450 is secured to one of the skins 422 to allow for drawing of a vacuum within the pocket 427 for a new or a repaired panel 400. The vacuum port 450 is installed in the panel 400 after the panel 400 is formed. To install the vacuum port 450, one of the skins 422 and a portion of the core 426 is machined to create a seat 451 to receive the vacuum port 450. The seat 451 may have a width, length, and/or depth less than the dimensions of the vacuum port 450 such that when the vacuum port 450 is inserted into the seat 451, the vacuum port forms a seal, e.g., a hermetic seal, with the skin 422, the core 426, and the barrier 428 such that the vacuum port 450 forms a seal of the pocket 427. The vacuum port 450 may be bonded using thermoset adhesive, ultrasonic welding, heat-activated thermoplastic adhesive, or induction heat-activated thermoplastic adhesive.

With the vacuum port 450 installed in the panel 400, a vacuum is drawn through a resealable passageway 452 of the vacuum port 450. The vacuum may be drawn with a high-performance vacuum pump such that an internal pressure within the pocket is less than 1 mbar. The vacuum port 450 includes is similar to the vacuum port 350 detailed above and includes a resalable passageway 452 that is in fluid communication with the pocket 427 when the vacuum port 450 is installed. The vacuum port 450 may include a vacuum indicator 454 similar to the vacuum indicator 340 detailed above. After the vacuum is drawn within the pocket 427 through the vacuum port 450, the vacuum within the pocket 427 may be tested for vacuum integrity. The vacuum may be tested with a vacuum indictor 454 of the vacuum port 450 or may be tested with a vacuum gauge connected to the passageway 452.

Similar to the panels detailed above, the panel 400 may be repaired if damage. Specifically, a patch of new skin material and barrier may be placed over the damaged area and laminated to the panel 400 to reform and seal the pocket 427. With the damaged area repaired, the vacuum port 450 may be used to redraw a vacuum within the pocket 427 to reestablish a vacuum within the pocket and restore the insulative value of the panel 400.

Figure 18:
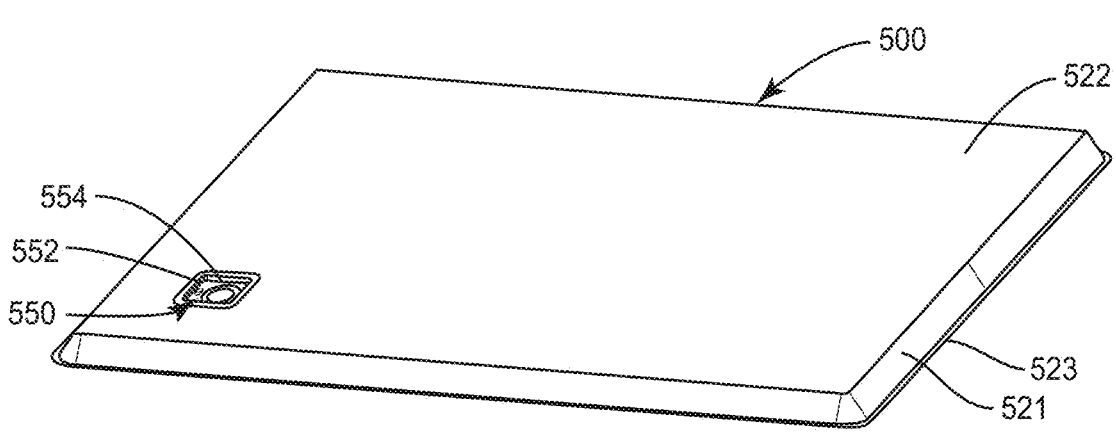
FIG. 18 is a perspective view of another panel provided in accordance with an embodiment of the present disclosure.
Figure 19:
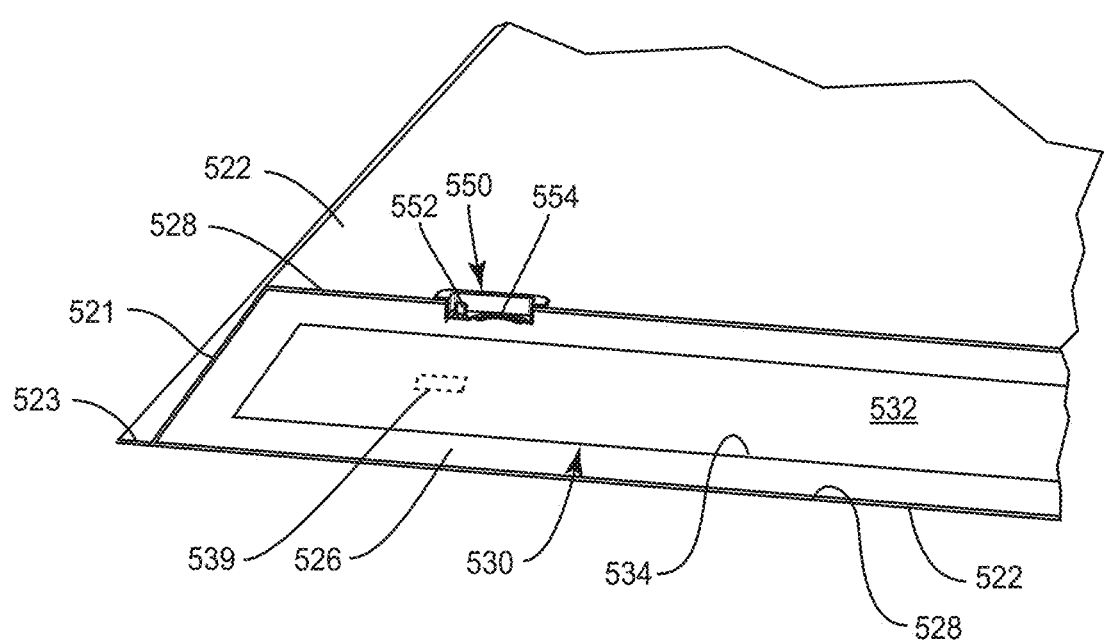
FIG. 19 is a cross-sectional view of a portion of the panel of FIG. 18.

Referring now to FIGS. 18 and 19, another panel 500 is provided in accordance with an embodiment of the present disclosure. The panel 500 includes skins 522, a foam core 526, and a VIP 530. In some embodiments, the panel 500 includes barriers 528. The skins 522, the foam core 526, and the barriers 528 are similar to the composite skins, the foam cores, and the barriers detailed above and will not be described in detail with respect to panel 500 except for differences with the descriptions above. In addition, the panel 500 may include a vacuum port 550 similar to the vacuum ports 350, 450 detailed above and will not be detailed herein for brevity.

The VIP 530 is disposed within a pocket 527 defined within the foam core 526. The VIP 530 may be premanufactured or preassembled before being disposed within the foam core 526 and include a barrier or envelope 534 that is disposed over a filler material 532. The envelope 534 maintains a vacuum within the VIP 530. The VIP 530 may have a substantially trapezoidal shape or any suitable shape for being disposed within a pocket 527 defined within the foam core 526.

The foam core 526 surrounds or encapsulates the VIP 530 to protect the VIP 530 and may be considered a buffer layer. The foam core 526 may provide a strong bond between the skins 522 and the VIP 530 such that the foam core 526 receives the higher shear and bending loads of the panel 500 when compared to the VIP 530. The foam core 526 may be a closed foam or may be a porous foam.

In some embodiments when the foam core 526 is a porous foam, the foam core 526 may be encapsulated by barriers 528 that are sealed together in edge portions 521 thereof in a similar manner to the forming of edge portions 321 detailed above. The edge portions 521 may include flanges 523 similar to the flanges 323 detailed above. In such embodiments, the barriers 528 encapsulate the foam core 526 such that a vacuum may be drawn in the foam core 526 in addition to the vacuum within the VIP 530. In certain embodiments, the panel 500 includes an internal rigid frame at the edges thereof similar to the rigid frame 440 detailed above with respect to the panel 400.

The vacuum within the foam core 526 may be less than the vacuum within the VIP 530 and may provide additional insulative value to the panel 500. The vacuum within the foam core 526 may extend a life of a vacuum within the VIP 530, e.g., reduce leakage of the VIP 530. In addition, even if the vacuum of the foam core 526 is compromised, the VIP 530 may continue to function, e.g., maintain a vacuum therein. The VIP 530 may include a vacuum indicator 539 disposed therein that provides a signal to a remote device indicative of the vacuum within the VIP 530. The vacuum indicator 539 may be a RFID or a Bluetooth® transmitter.

In particular embodiments, the panel 500 includes the vacuum port 550 that includes a passageway 552 and a vacuum indicator 554. The vacuum port 550 is disposed through a skin 522 and into the foam core 526 without penetrating the VIP 530. The vacuum port 550 forms a seal with the skin 522 and the barrier 528 such that the foam core 526 is sealed. The vacuum port 550 may be used in a manner as detailed above with respect to vacuum ports 350, 450 to draw or redraw a vacuum within the foam core 526. The foam core 526 may have an insulative value of R-5 when fluid is disposed therein and may have an insulative value of R-20 when a vacuum is drawn therein.

Figures 20, 21:
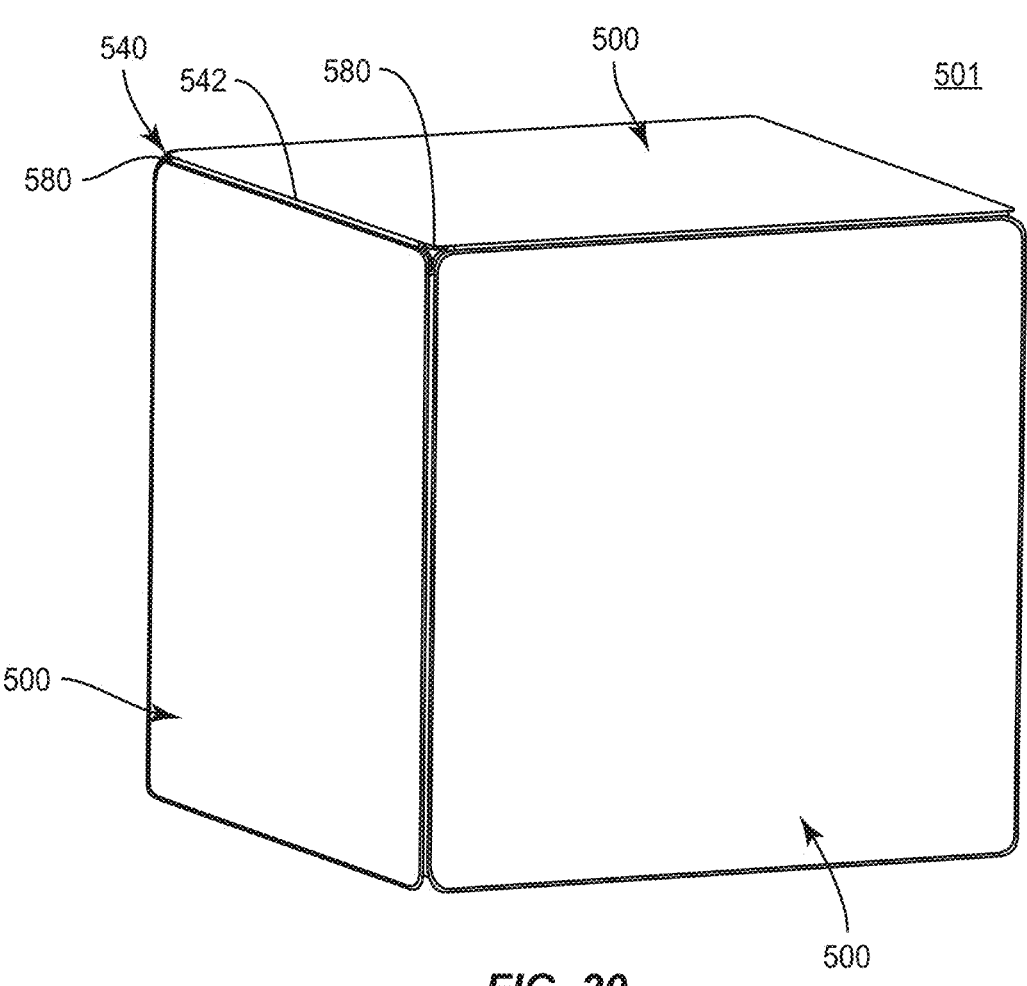
FIG. 20 is a perspective view of a cargo container provided in accordance with an embodiment of the present disclosure including panels of FIG. 18.
FIG. 21 is a cross-sectional view of a portion of the cargo container of FIG. 20.

With reference to FIGS. 20 and 21, the panels 500 may form a cargo container 501 with a frame 540. The frame 540 includes frame elements 542 and joint elements 580 that form the rigid frame 540. The frame elements 542 and the joint elements 580 may include insulation in the form of foam and/or filler material as detailed above such that the cargo container 501 includes edge-to-edge insulation and may be considered entirely insulated. For example, the frame elements 542 and/or joint elements 580 may be filled with a filler material 546 or foam (not explicitly shown) that is encapsulated by a frame barrier 548. The filler material 546, foam, and the frame barrier 548 may be similar to the filler materials, the foams, and the barriers detailed above and will not be detailed herein for brevity. The frame elements 542 and/or the joint elements 580 may have a vacuum drawn therein to increase an insulative value of the frame 540.

To form the cargo container 501, the flanges 523 of the panels 500 may be secured to the frame 540 by an adhesive, e.g., thermoplastic adhesive, that bonds the panels 500 to the frame 540. Additionally or alternatively, the flanges 523 may be secured to the frame 540 by one or more fasteners passing therethrough. The fasteners may be secured into a solid core portion of the frame 540 which are similar to the solid core portions 460 detailed above.

The panels detailed herein are described with respect to an air cargo container. However, it is contemplated that the panels detailed herein may be constructed with structural characteristics suitable for other applications including cargo containers for use on trucks, ships, or trains. Such cargo containers by be in the form of a trailer for a truck, a shipping container for a ship, or a train car. In addition, the panels detailed herein may be suitable for buildings requiring insulated walls. For example, the panels detailed herein may be suitable for exterior walls or as an insulating layer on the outer surface of a wall. In addition, the panels detailed herein may be used to construct refrigeration units such as those used in hospitality, restaurant, or laboratory environments. When an enclosure or container is formed of the panels detailed herein, the enclosure or container may maintain an elevated or a reduced temperature to an environment surrounding the enclosure or container with minimal transfer of energy through the panels.

While several embodiments of the disclosure have been shown in the drawings, it is not intended that the disclosure be limited thereto, as it is intended that the disclosure be as broad in scope as the art will allow and that the specification be read likewise. Any combination of the above embodiments is also envisioned and is within the scope of the appended claims. Therefore, the above description should not be construed as limiting, but merely as exemplifications of particular embodiments. Those skilled in the art will envision other modifications within the scope of the claims appended hereto.

What is claimed:

1. A thermally insulated panel for a container, the panel comprising:

a first skin;

a second skin spaced apart from the first skin;

a core disposed between the first skin and the second skin, a porous open cell foam disposed within the core;

edge portions each formed of a portion the first skin, the second skin, and the core, each edge portion formed to define a desired shape, the desired shape having a thickness less than the thickness of the rest of the first skin, the second skin, and the core outside of the respective edge portion, the first skin and the second skin forming a seal in each edge portion such that the core is encapsulated within a sealed pocket between the first skin and the second skin;

an envelope positioned between the first skin and the second skin with the core encapsulated by the envelope, the pocket defined within the envelope, the first skin and the second skin encapsulating the envelope, a vacuum drawn within the core encapsulated by the envelope; and struts disposed between the first skin and the second skin, each strut extending in a direction from the first skin towards the second skin and configured to maintain a distance between of the first skin and the second skin.

2. The panel according to claim 1, wherein at least one edge portion includes a flange that forms a seal between the first skin and the second skin.

3. The panel according to claim 1, wherein the envelope is secured directly to each of the first skin and the second skin.

4. The panel according to claim 1, wherein the pocket is configured to receive a filler material and have a vacuum drawn therein.

5. The panel according to claim 1, further comprising a port secured to the first skin or the second skin, the port including a resealable passageway in communication with the pocket, the passageway configured to permit a vacuum to be drawn within the pocket.

6. The panel according to claim 1, further comprising a vacuum indicator secured to the first skin or the second skin, the vacuum indicator in communication with the pocket and configured to provide indicia of a desired vacuum within the pocket.

7. The panel according to claim 6, wherein the vacuum indicator is mechanical and configured to provide visual indicia of a desired vacuum within the pocket.

8. The panel according to claim 6, wherein the vacuum indicator is electrical and configured to provide visual indicia of a desired vacuum within the pocket.

9. The panel according to claim 1, wherein the struts form a honeycomb structure between of the first skin and the second skin, each strut including a portion of the pocket therewithin.

10. The panel according to claim 9, further comprising a filler material disposed within the portion of the pocket, the filler material configured to provide rigidity to the strut.

11. The panel according to claim 9, wherein each strut includes a passage in communication with an adjacent strut such that vacuum equalization occurs within the entire pocket.

12. The panel according to claim 1, wherein the envelope is bonded to the first skin, the second skin, and the core.

13. A thermally insulated container, the container comprising:

a first thermally insulated panel according to claim 1; and a second thermally insulated panel according to claim 1, the first panel and the second panel defining a cargo space therebetween.

14. A method of manufacturing a thermally insulated panel, the method comprising:

encapsulating a core within an envelope;

applying a first skin over the envelope;

applying a second skin over the envelope, the core including struts disposed between the first skin and the second skin, each strut extending in a direction from the first skin towards the second skin and configured to maintain a distance between of the first skin and the second skin;

thermoforming edge portions of the first skin, the second skin, the envelope, and the core, the envelope defining a sealed pocket therewithin, the core sealed within the pocket; and establishing a vacuum within the pocket after thermoforming the edge portions of the first skin, the second skin, and the core.

15. The method according to claim 14, further comprising installing a port to the first skin or the second skin, the port including a resealable passageway in communication with the pocket.

16. The method according to claim 15, wherein establishing a vacuum within the pocket includes drawing a vacuum through the passageway of the port to establish a vacuum within the pocket.

17. A cargo container comprising:

a plurality of thermally insulated panels defining a cavity therebetween, each panel of the thermally insulated panels comprising:

a first skin;

a second skin spaced apart from the first skin;

a core disposed between and bonded to the first skin and the second skin such that the core transfers shear loads between the first skin and the second skin, the core including a porous filler material, the porous filler material having a vacuum drawn therein such that the core resists transfer of thermal energy through the panel; and an envelope positioned between the first skin and the second skin, the pocket defined within the envelope, the first skin and the second skin encapsulating the envelope with the core encapsulated by the envelope; and struts disposed between the first skin and the second skin, each strut extending in a direction from the first skin towards the second skin and configured to maintain a distance between of the first skin and the second skin.

18. The cargo container according to claim 17, wherein the porous filler material includes an open cell foam.

\* \* \* \* \*